(12) United States Patent
Bohlen et al.

(10) Patent No.: US 11,976,517 B2
(45) Date of Patent: May 7, 2024

(54) MOUNTING ELEMENT FOR MOUNTING AN ARCHITECTURAL COVERING BETWEEN OPPOSING MOUNTING SURFACES

(71) Applicant: Hunter Douglas Industries B.V., Rotterdam (NL)

(72) Inventors: Jörg Bohlen, Rotterdam (NL); Katharina Vangberg-Brinkmann, Rotterdam (NL)

(73) Assignee: Hunter Douglas Industries B.V., Rotterdam (NL)

( * ) Notice: Subject to any disclaimer, the term of this patent is extended or adjusted under 35 U.S.C. 154(b) by 546 days.

(21) Appl. No.: 17/168,416

(22) Filed: Feb. 5, 2021

(65) Prior Publication Data

US 2021/0180400 A1 Jun. 17, 2021

Related U.S. Application Data

(63) Continuation of application No. 15/910,472, filed on Mar. 2, 2018, now Pat. No. 10,934,771.

(30) Foreign Application Priority Data

| Mar. 6, 2017 | (EP) | 17159407 |
| Nov. 3, 2017 | (EP) | 17199900 |
| Feb. 22, 2018 | (EP) | 18158025 |

(51) Int. Cl.
*E06B 9/42* (2006.01)
*A47H 27/00* (2006.01)
(Continued)

(52) U.S. Cl.
CPC ............. *E06B 9/42* (2013.01); *A47H 27/00* (2013.01); *E06B 9/323* (2013.01); *F16H 21/44* (2013.01);
(Continued)

(58) Field of Classification Search
CPC ...... E06B 9/42; E06B 9/323; E06B 2009/002; A47H 27/00; A47H 2/02; A47H 1/12;
(Continued)

(56) References Cited

U.S. PATENT DOCUMENTS 2,888,226 A * 5/1959 Andriot ............... A47G 5/04
248/251
3,110,506 A 11/1963 O'Brien
(Continued)

*Primary Examiner* — Daniel P Cahn
*Assistant Examiner* — Jeremy C Ramsey
(74) *Attorney, Agent, or Firm* — Dority & Manning, P.A.

(57) ABSTRACT

A mounting element for mounting an architectural covering between two opposing mounting surfaces may include an elongate mounting member, and an extension mechanism operable between: i) a retracted state, and ii) an extended state in which the mounting element can be fastened to the architectural recess. The mounting element may also include an actuator rotatable about a rotation axis, and a conversion mechanism to convert a rotation of the actuator into a translatory movement of the rotation axis along the longitudinal direction and vice versa. The extension mechanism is arranged to abut one of the opposing mounting surfaces in the extended state when the mounting element is mounted between the opposing mounting surfaces.

17 Claims, 15 Drawing Sheets

(51) Int. Cl.
  *E06B 9/323* (2006.01)
  *F16H 21/44* (2006.01)
  *F16M 13/02* (2006.01)

(52) U.S. Cl.
  CPC ......... *F16M 13/02* (2013.01); *F16M 2200/02* (2013.01)

(58) Field of Classification Search
  CPC .......... A47H 1/022; A47H 1/08; F16H 21/44; F16M 13/02; F16M 2200/02
  See application file for complete search history.

(56) References Cited

U.S. PATENT DOCUMENTS

| | | | |
|---|---|---|---|
| 4,782,882 | A | 11/1988 | Amedeo et al. |
| 6,131,638 | A | 10/2000 | Levin |
| 7,334,973 | B2 * | 2/2008 | Scott .................. B60P 7/15 410/151 |
| 7,549,615 | B2 | 6/2009 | Shevick |
| 9,410,367 | B2 | 8/2016 | Coker et al. |
| 2009/0242143 | A1 | 10/2009 | Pham |
| 2011/0242827 | A1 | 10/2011 | Farinola |
| 2017/0247942 | A1 * | 8/2017 | Hall .................. E06B 9/266 |
| 2017/0362889 | A1 | 12/2017 | Hall |
| 2018/0328105 | A1 * | 11/2018 | Hall .................. F16B 2/04 |
| 2021/0230940 | A1 * | 7/2021 | Hall .................. E06B 9/323 |

\* cited by examiner

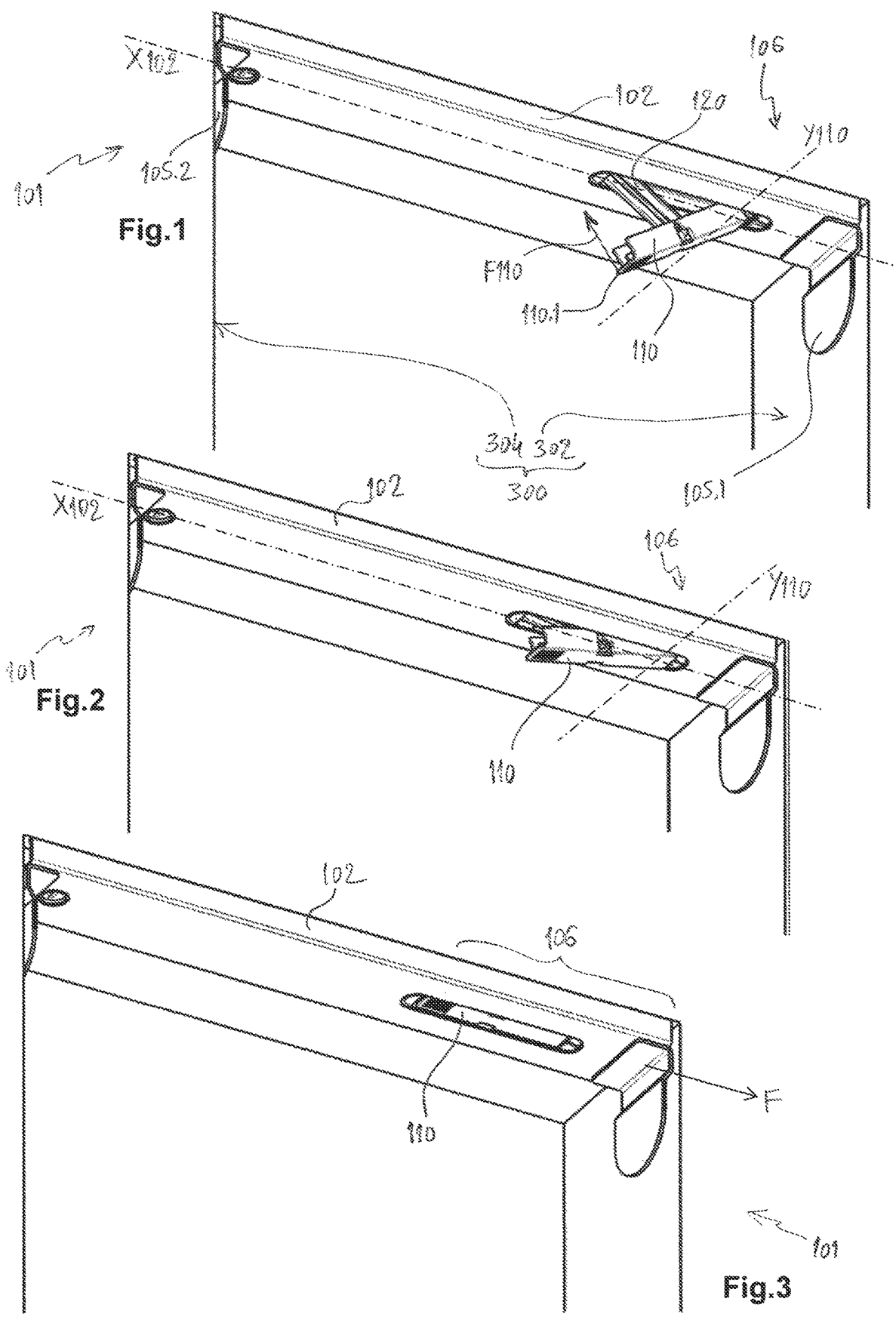

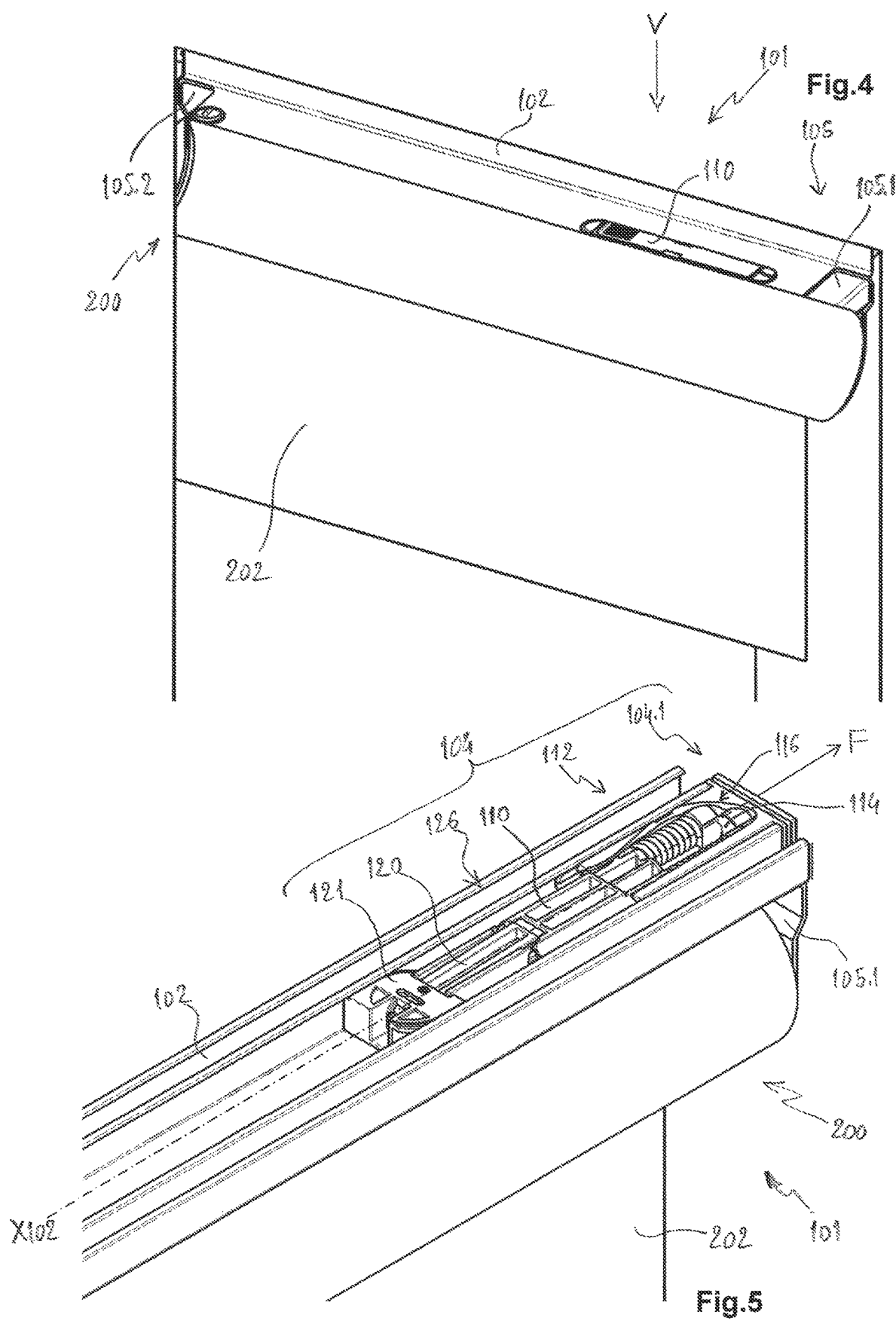

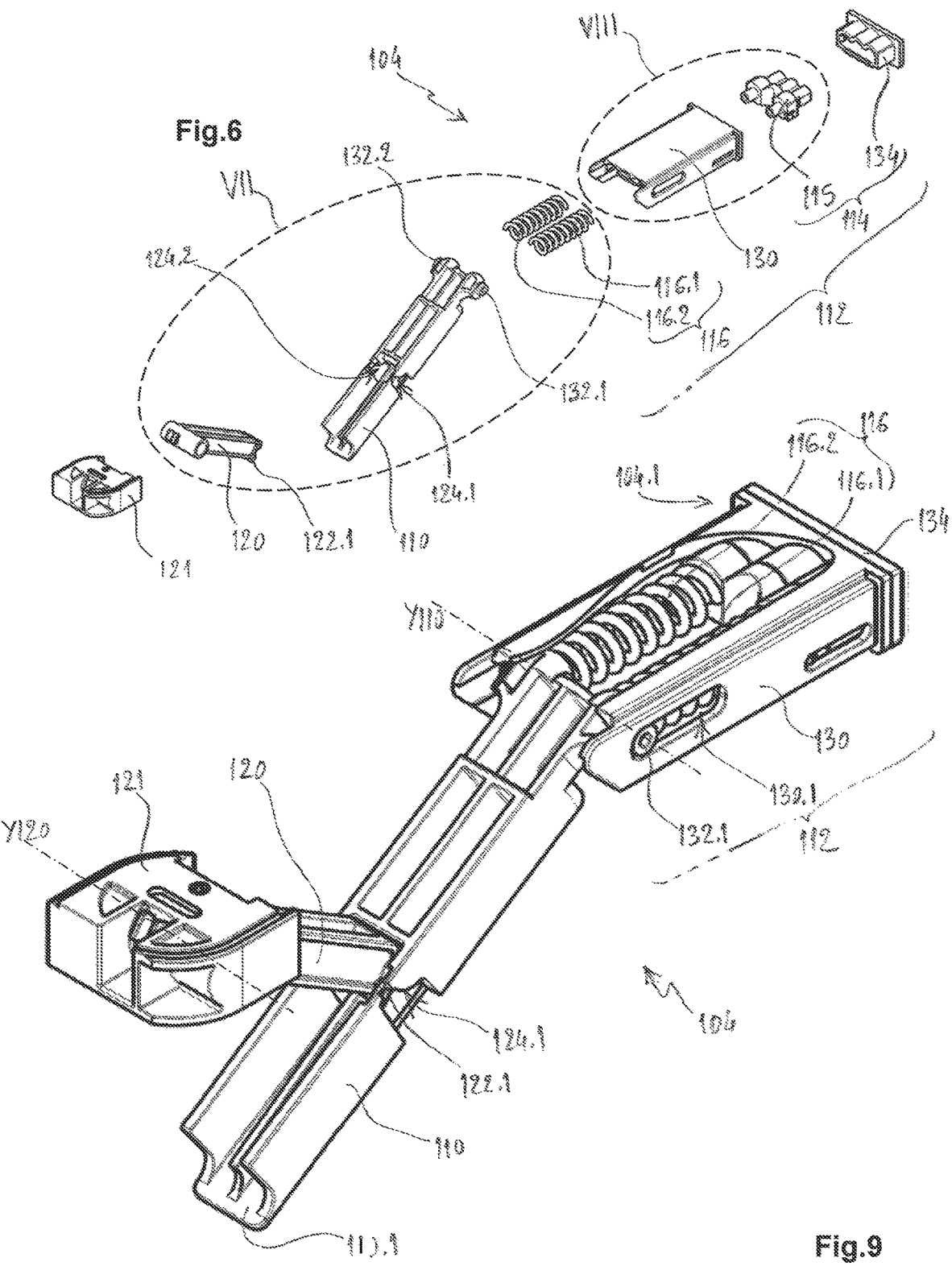

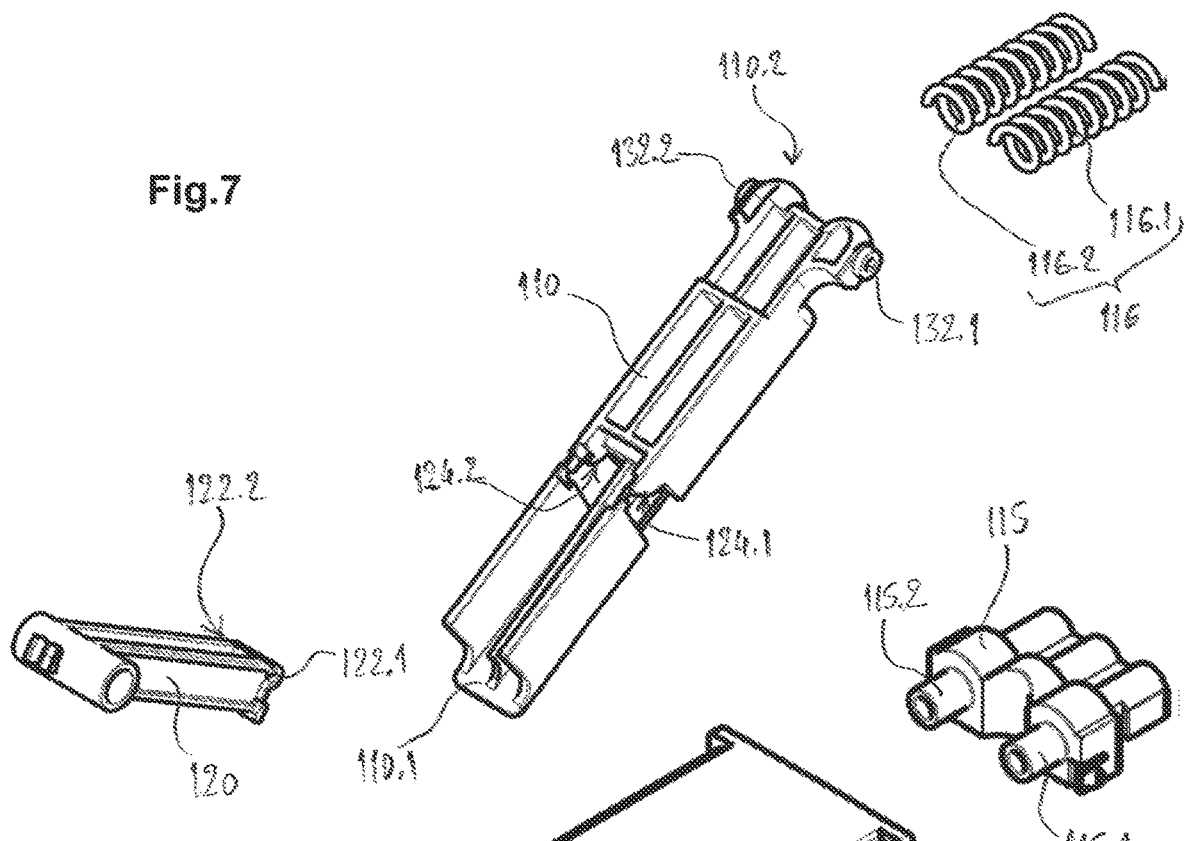
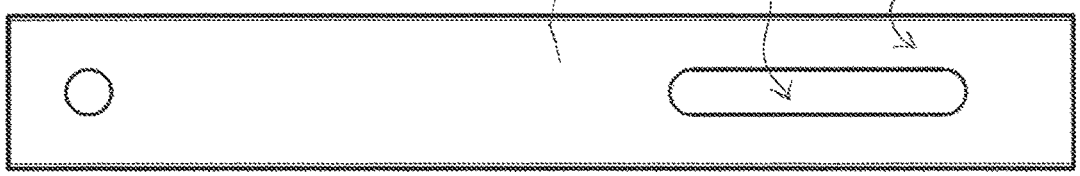

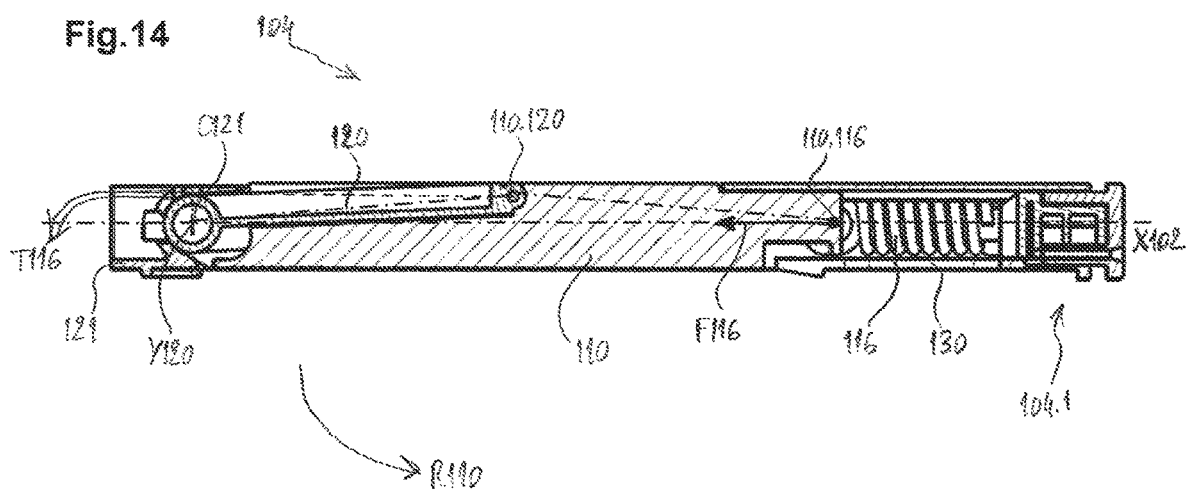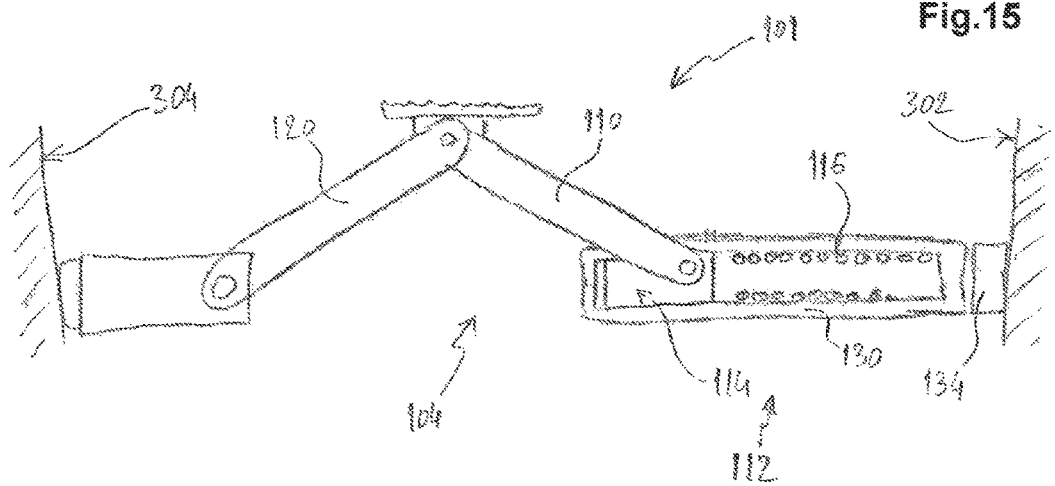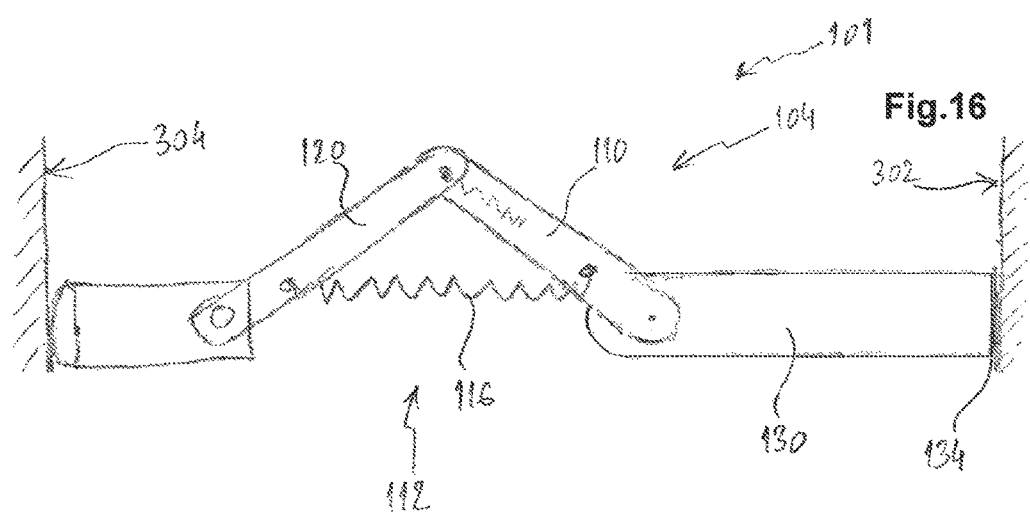

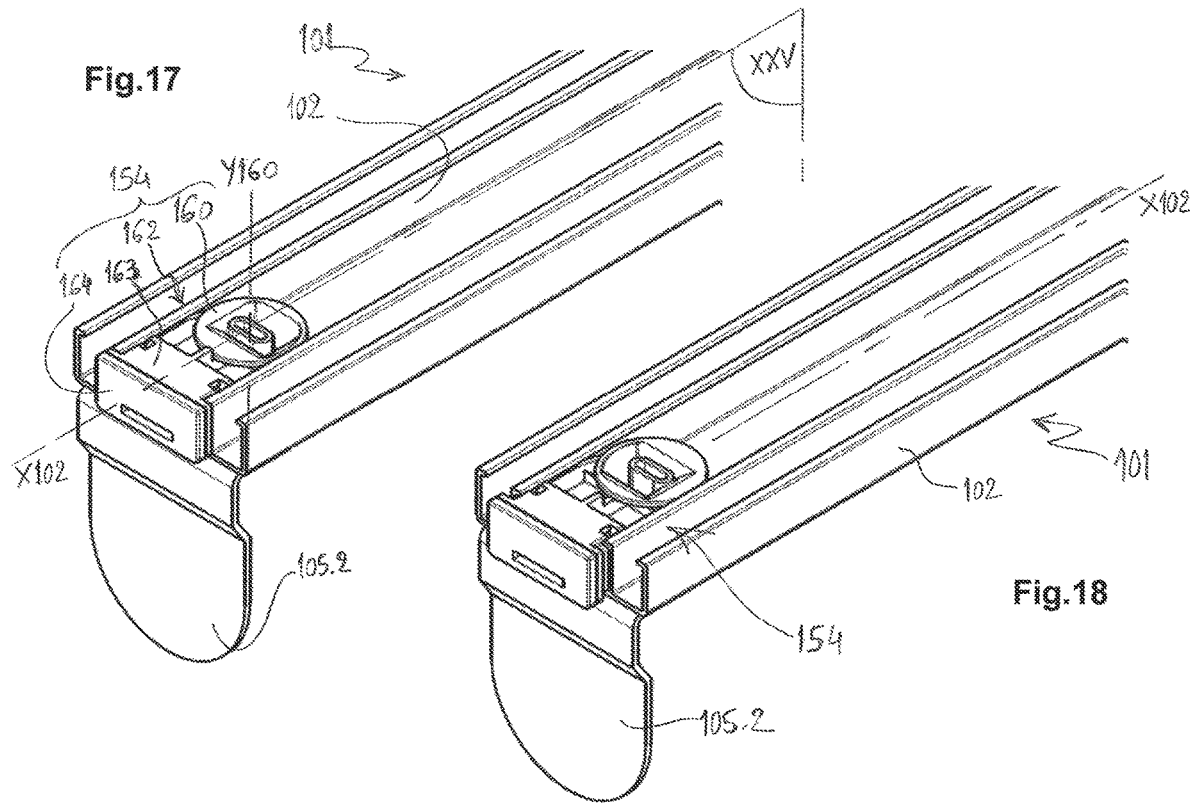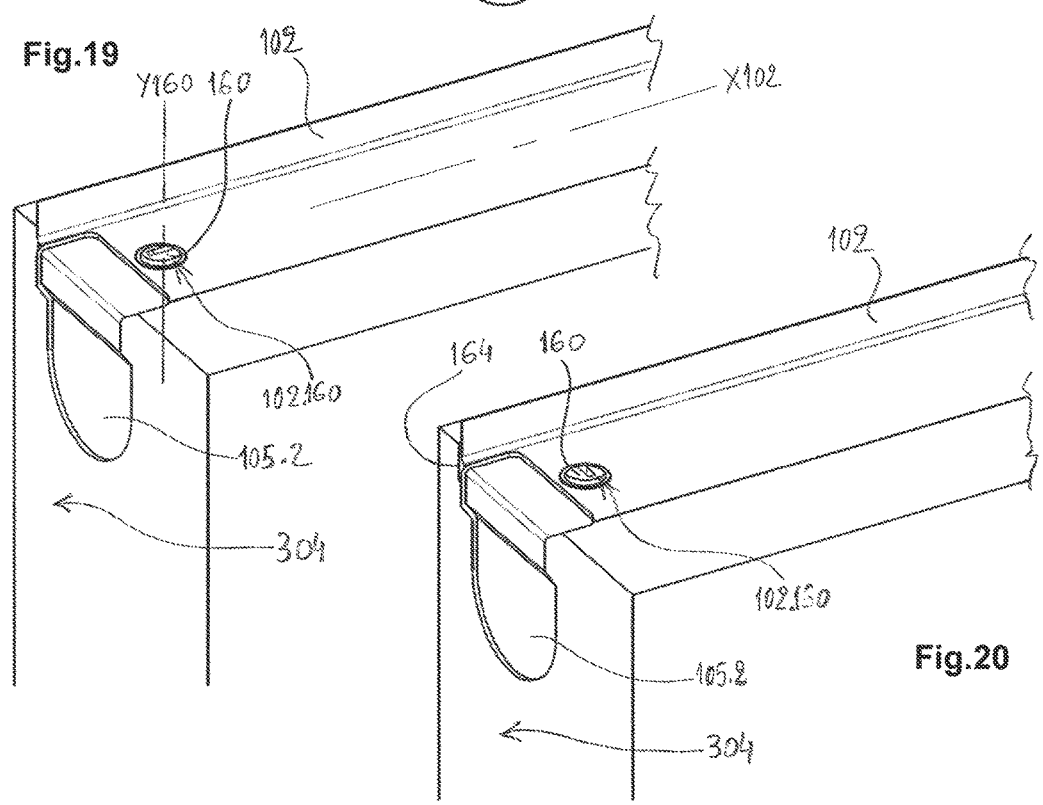

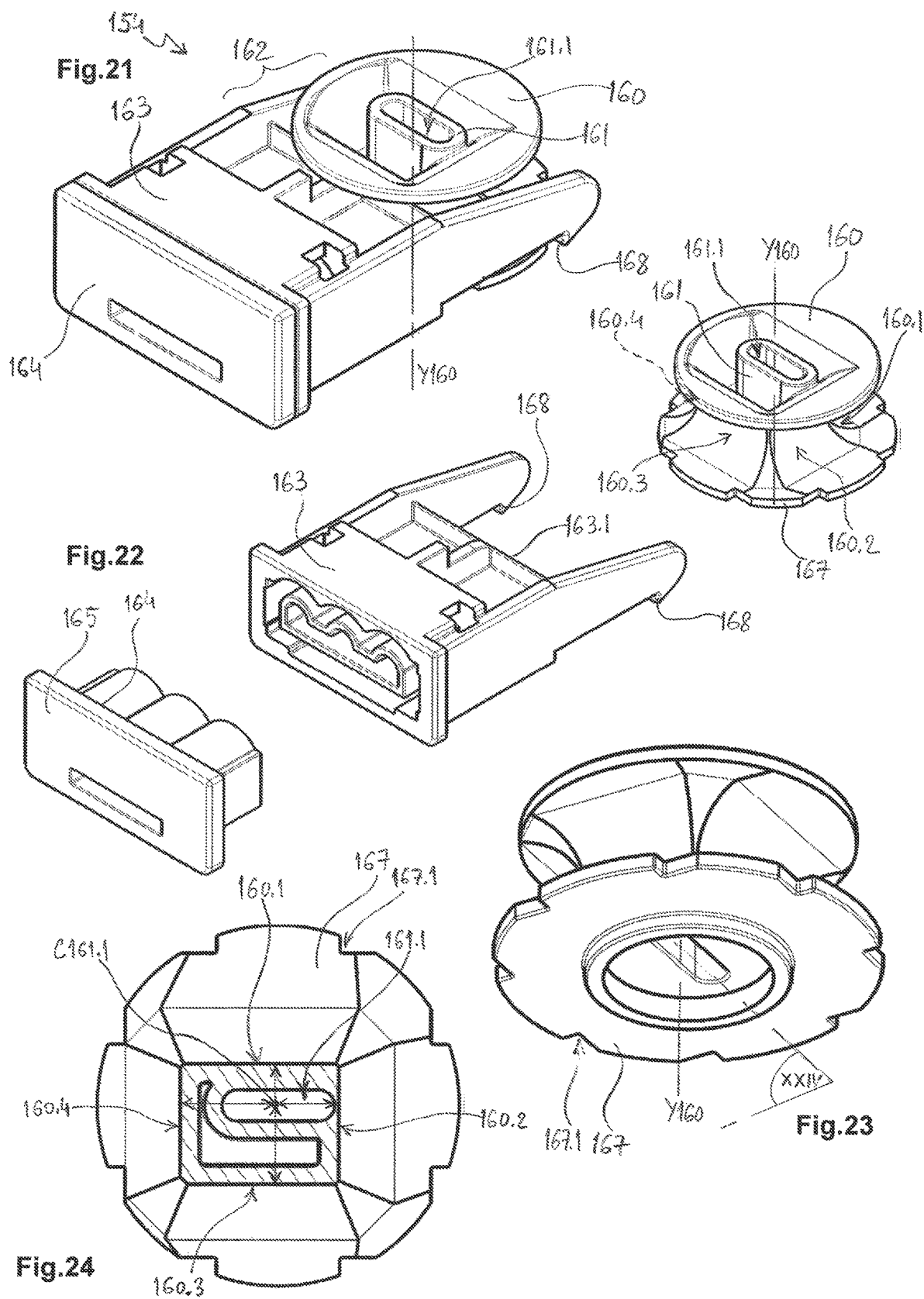

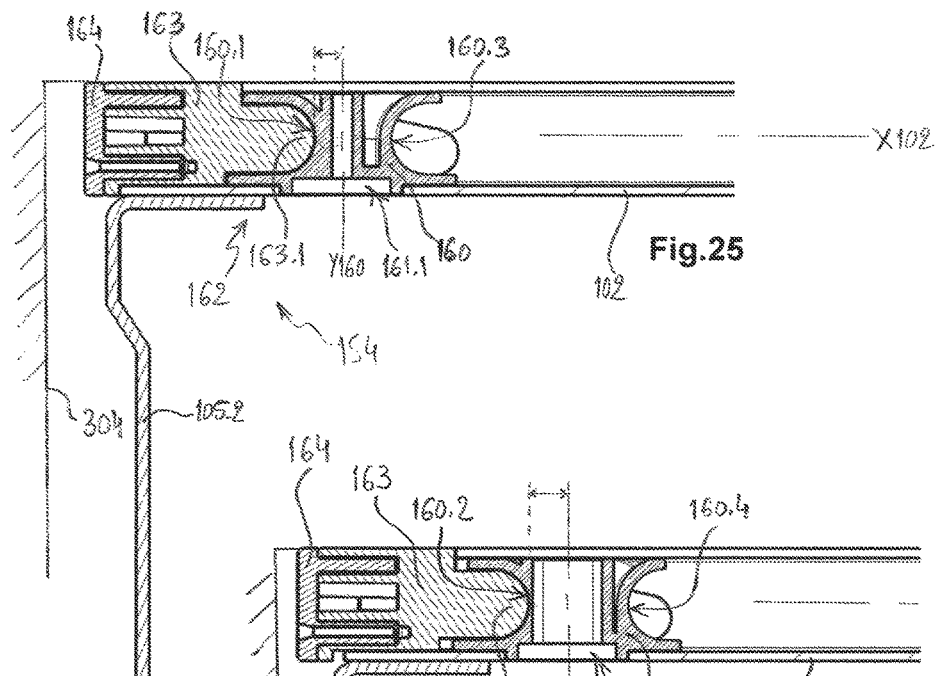
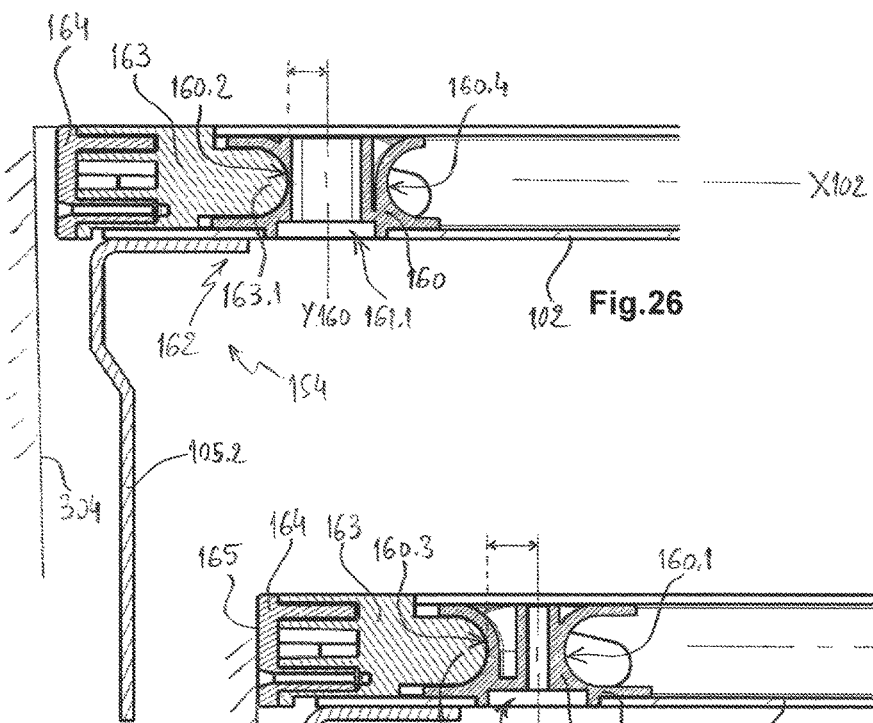
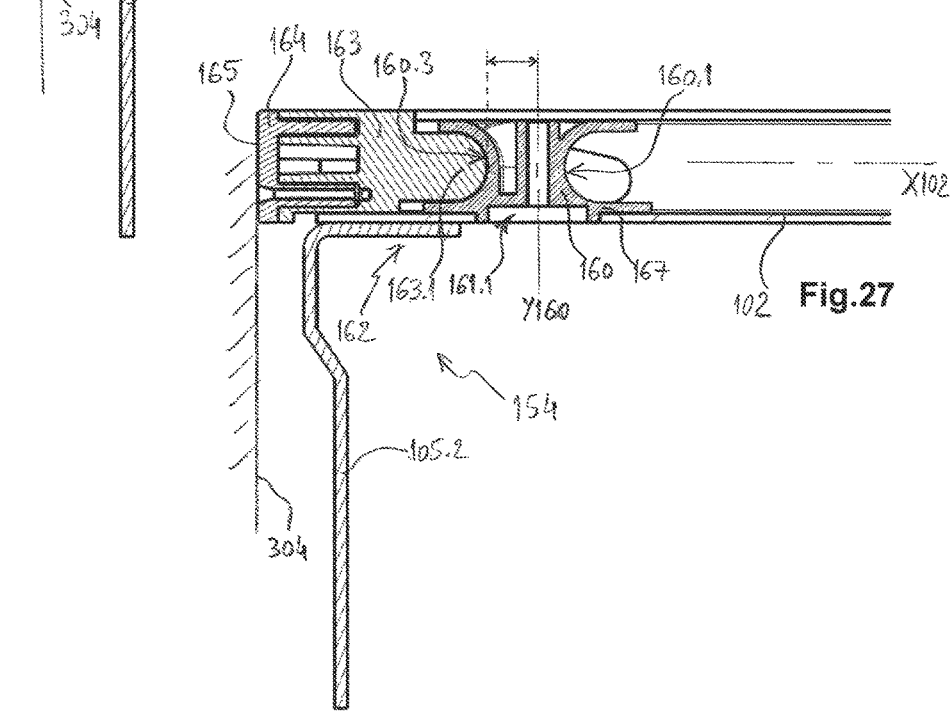

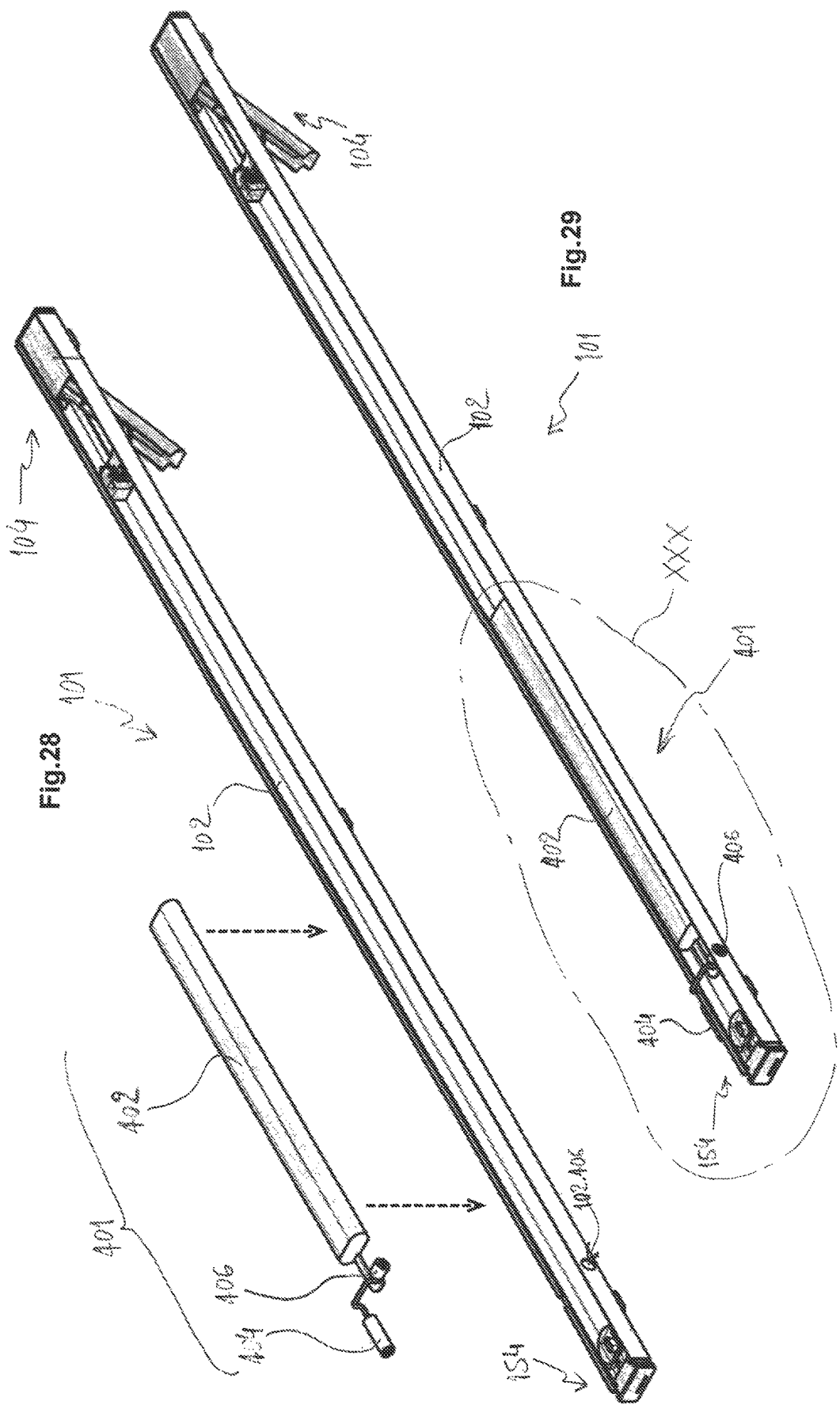

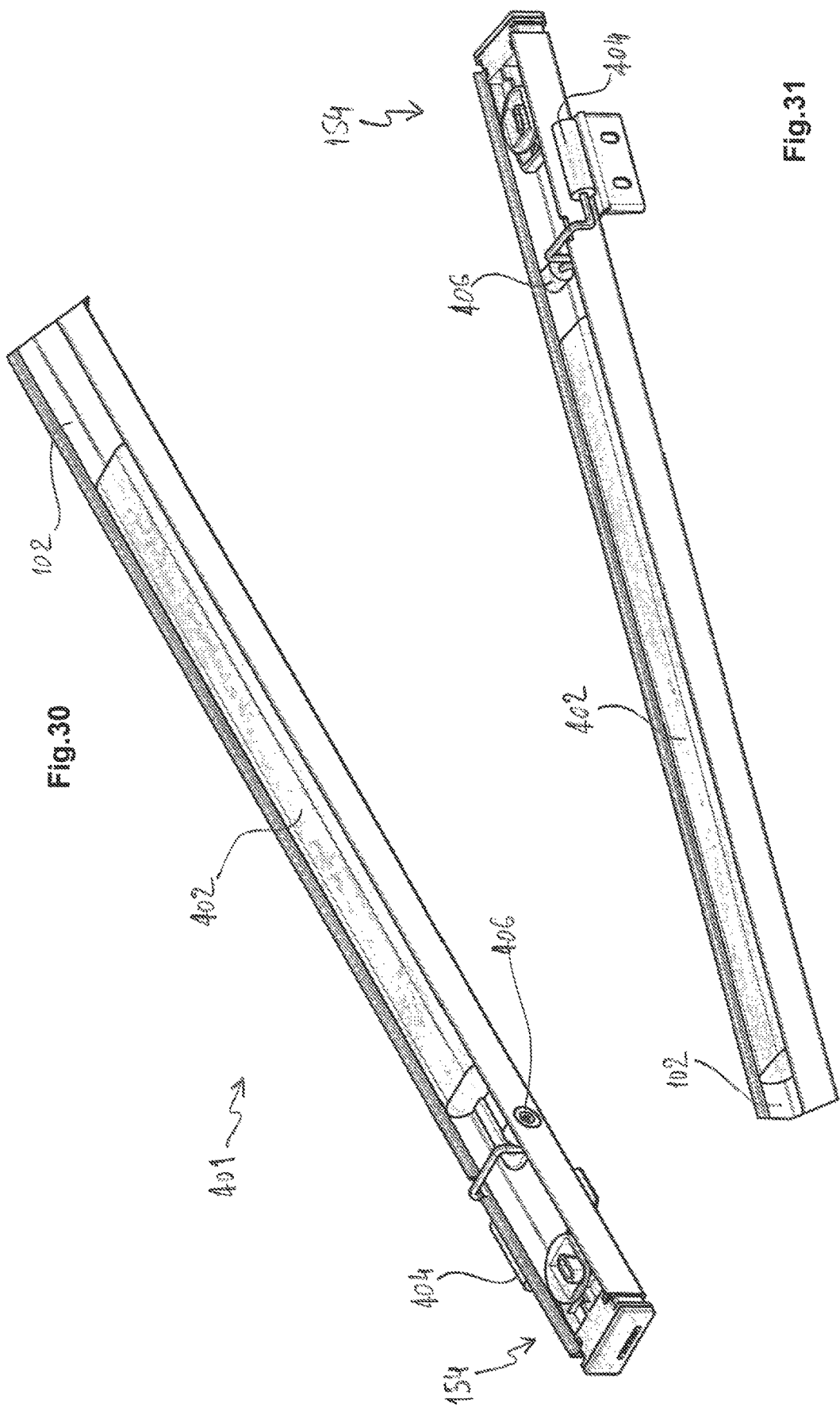

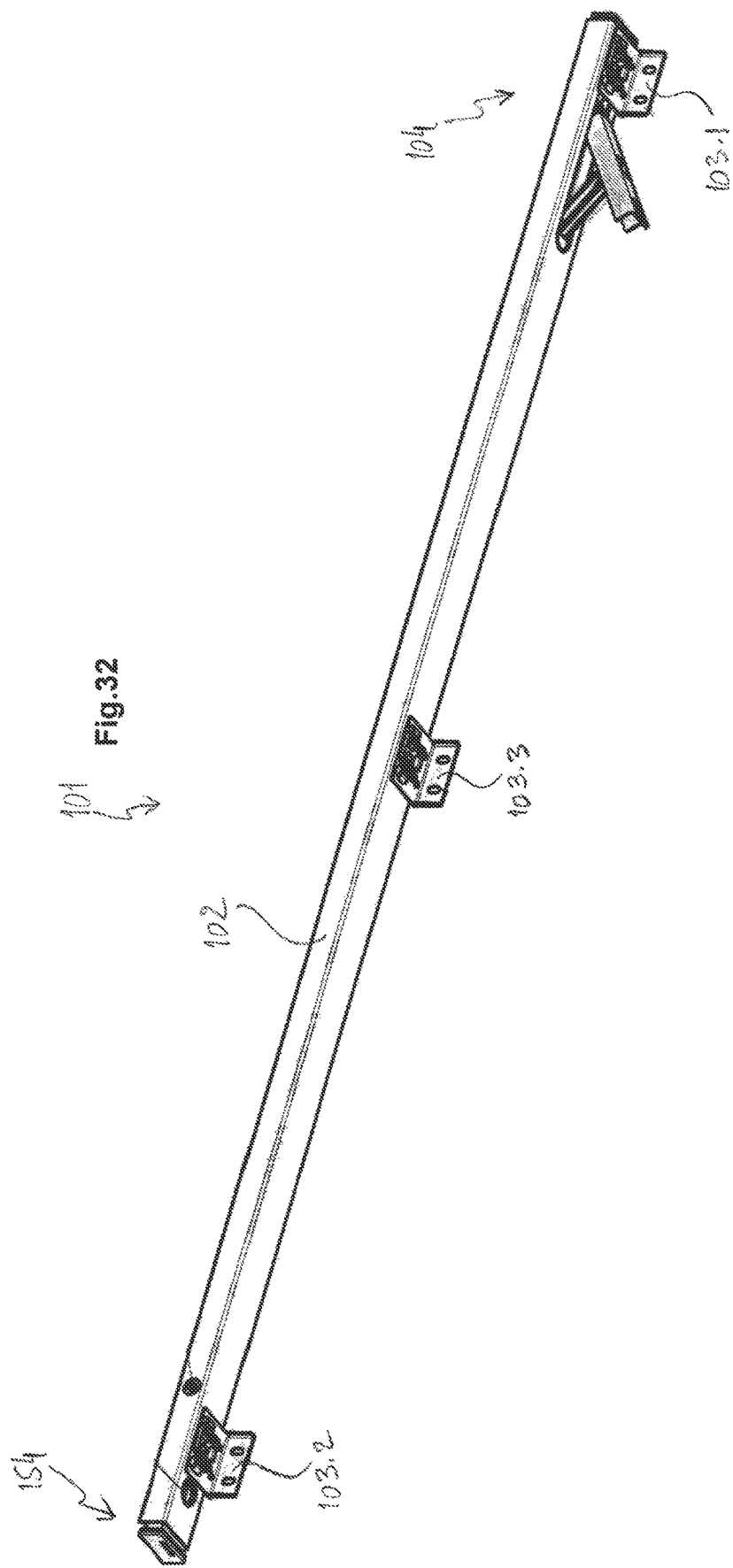

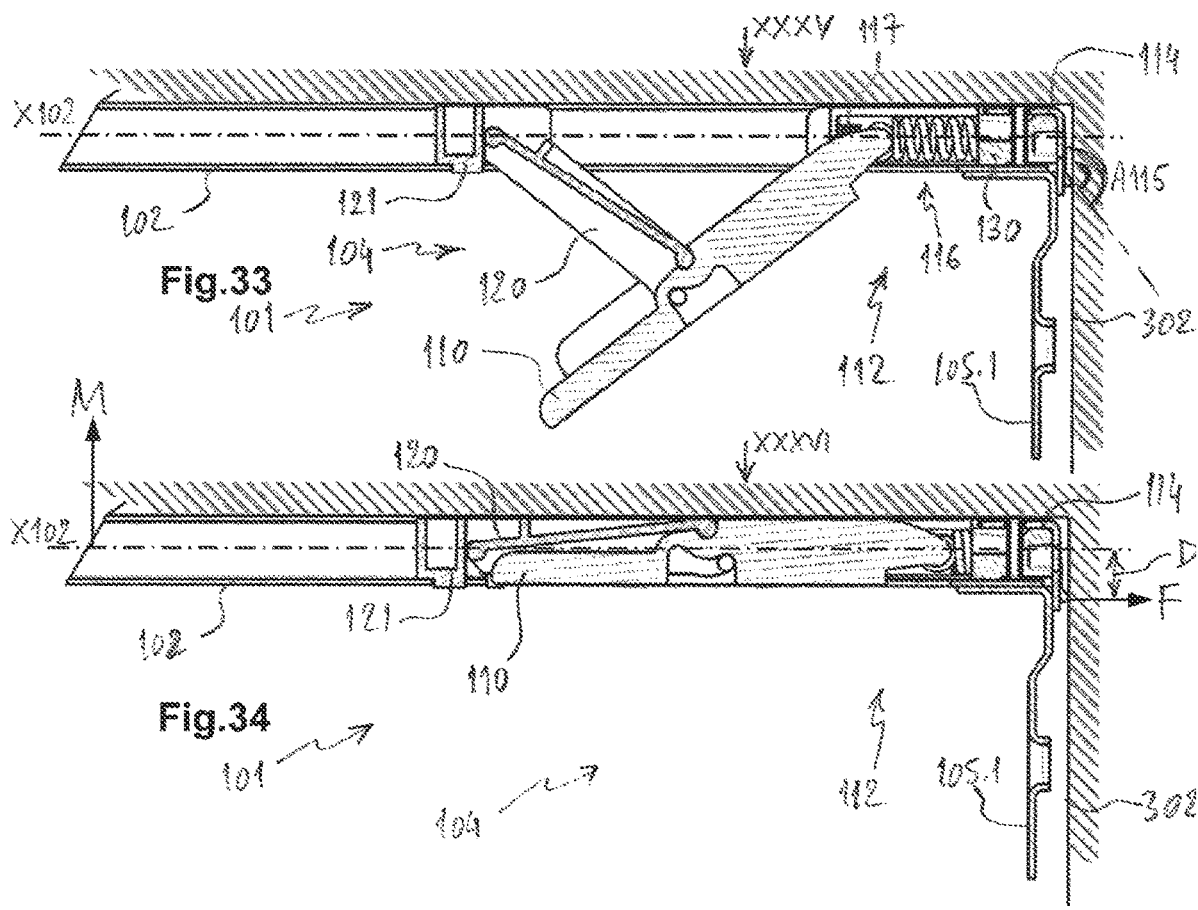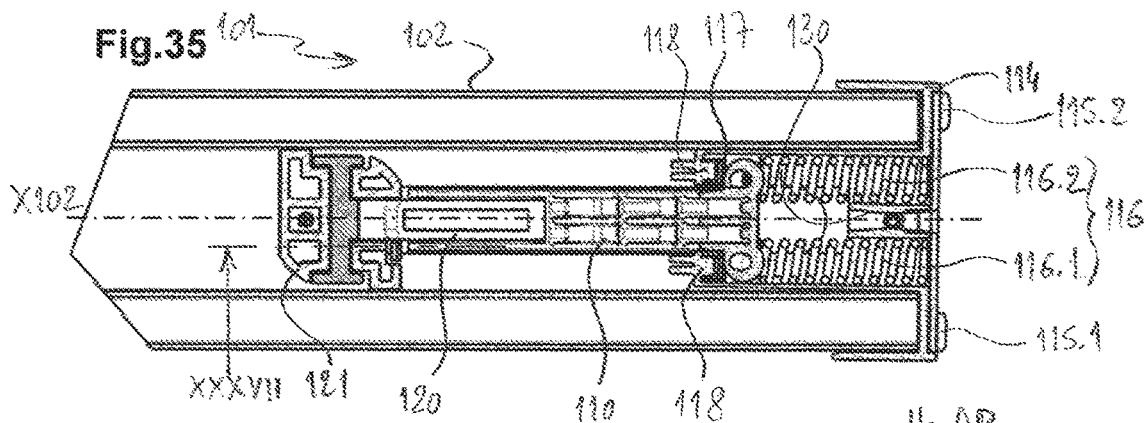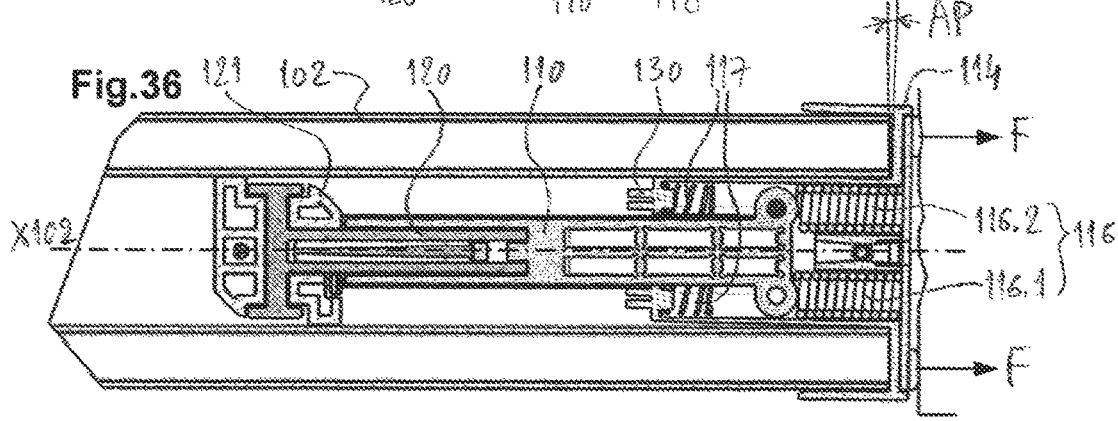

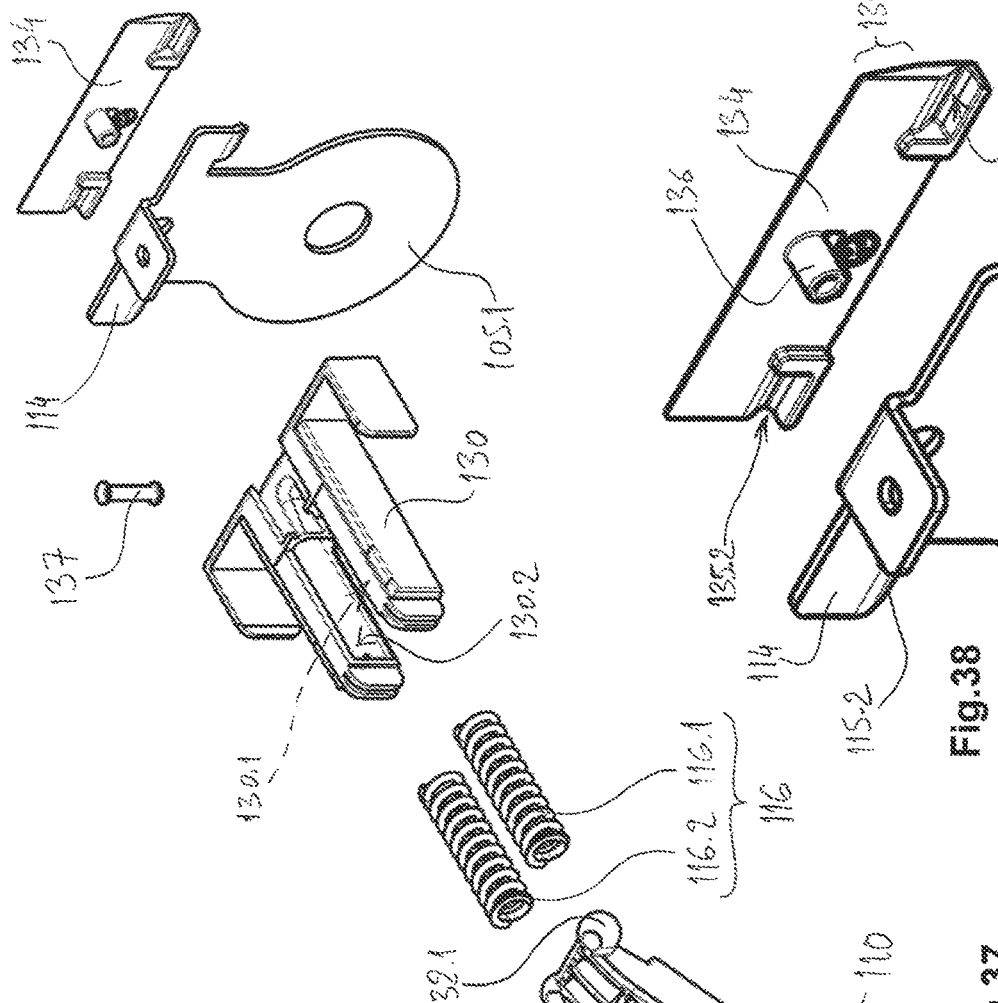
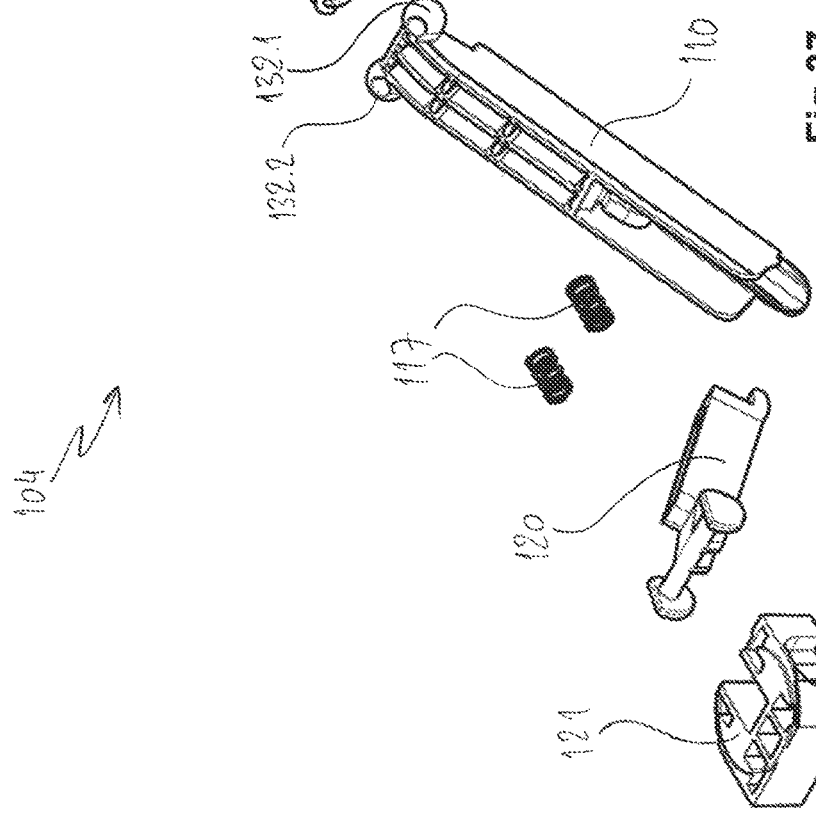

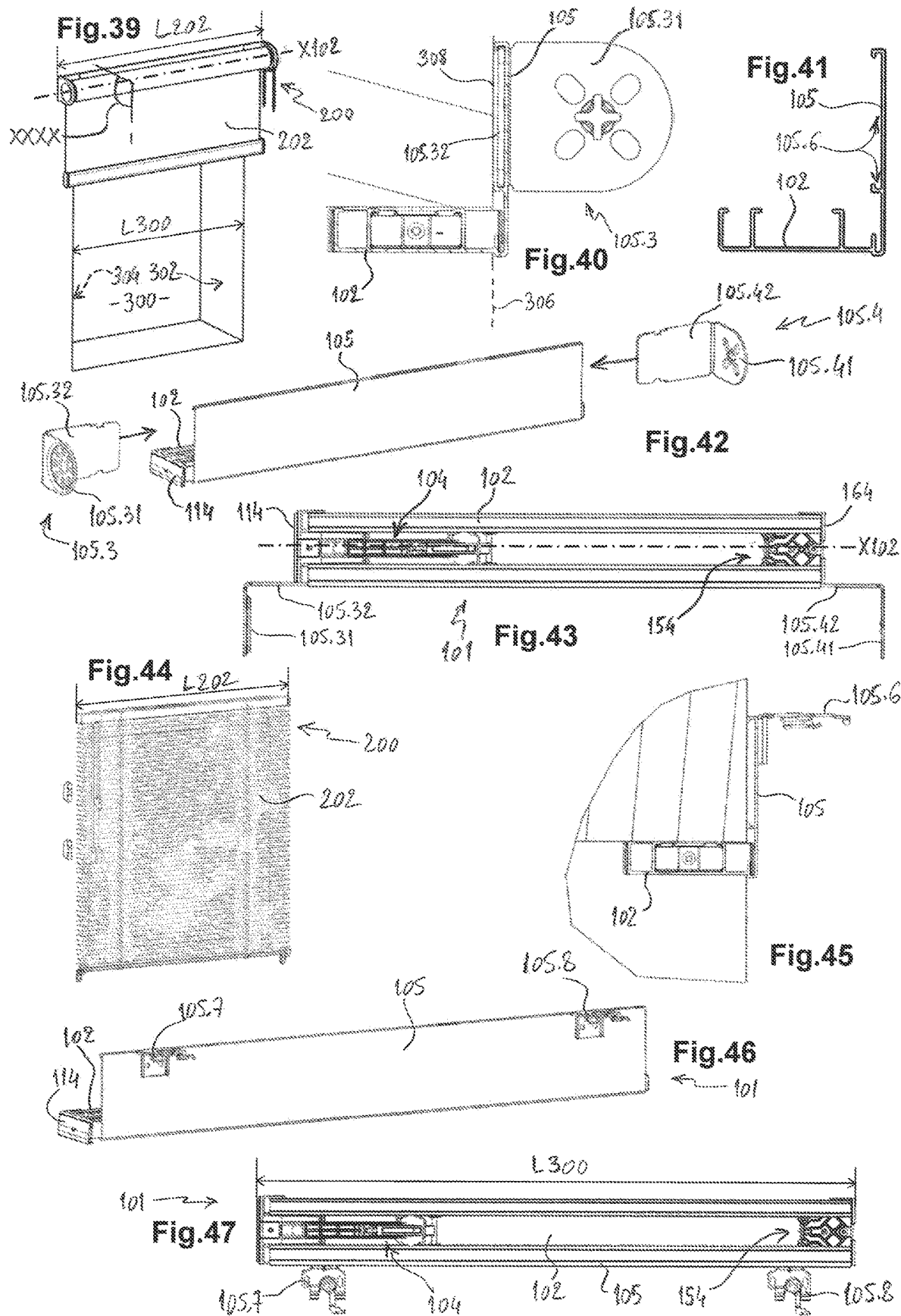

MOUNTING ELEMENT FOR MOUNTING AN ARCHITECTURAL COVERING BETWEEN OPPOSING MOUNTING SURFACES

CROSS-REFERENCE TO RELATED APPLICATIONS

This application is a continuation of U.S. application Ser. No. 15/910,472, filed Mar. 2, 2018, which, in turn, is based upon and claims the right of priority to EP Patent Application No. 17159407.0, filed on Mar. 6, 2017, EP Patent Application No. 17199900.6, filed on Nov. 3, 2017, and EP Patent Application No. 18158025.9, filed on Feb. 22, 2018, the disclosures of all of which are hereby incorporated by reference herein in their entirety for all purposes.

TECHNICAL FIELD

The present disclosure relates to a mounting element for mounting an architectural covering, such as a blind, between two opposing mounting surfaces, e.g. by a force fit (frictional fit) and/or form fit (e.g. if the recess has matching female or male relief). Furthermore, the present disclosure relates to an architectural covering comprising such a mounting element.

BACKGROUND ART

US20140086676A1, which is incorporated herein by reference in its entirety, describes a so-called headrail for fixing an architectural covering in an architectural recess. The headrail of US20140086676A1 comprises an elongated member, for mounting the architectural covering in the architectural recess, and an extension mechanism manually moveable between a retracted state and an extended state.

However, the extension mechanism of US20140086676A1 is quite difficult to access, and hence difficult to manually operate. Moreover, the extension mechanism necessitates numerous components, which renders expensive the whole headrail. Besides, some of these components are relatively fragile and risk being broken after the extension mechanism has been operated several times.

SUMMARY

This Summary is not intended to identify key features or essential features of the claimed subject matter, nor is it intended as an aid in determining the scope of the claimed subject matter.

Disclosed herein is an improved mounting element, which alleviates the afore-mentioned drawbacks. Such drawbacks may be alleviated or reduced with a mounting element for mounting an architectural covering between two opposing mounting surfaces, the mounting element comprising:
an elongate mounting member which is elongated along a longitudinal direction, and
an extension mechanism arranged at an end of the elongate mounting member, the extension mechanism being operable between: i) a retracted state, and ii) an extended state,
wherein the extension mechanism comprises:
an actuator rotatable about a rotation axis, the rotation axis being substantially perpendicular to the longitudinal direction, and
a conversion mechanism configured to convert a rotation of the actuator into a translatory movement of the rotation axis along the longitudinal direction from the retracted state to the extended state and vice versa,
wherein the extension mechanism is arranged to abut one of the opposing mounting surfaces in the extended state when the mounting element is mounted between the opposing mounting surfaces.

Besides, another object is to provide a mounting element, for mounting an architectural covering between two opposing mounting surfaces, the mounting element comprising:
an elongate mounting member which is elongated along a longitudinal direction, and
an extension mechanism arranged at an end of the elongate mounting member, the extension mechanism being operable between: i) a retracted state, and ii) an extended state,
wherein the extension mechanism comprises at least:
an actuator displaceable by a force having at least one component orthogonal to the longitudinal direction, and
a conversion mechanism configured to convert a rotation of the actuator into a translatory movement of the rotation axis along the longitudinal direction from the retracted state to the extended state and vice versa,
wherein the extension mechanism is arranged to abut one of the opposing mounting surfaces in the extended state when the mounting element is mounted between the opposing mounting surfaces.

A second object is to provide a mounting element for mounting an architectural covering between two opposing mounting surfaces, the mounting element comprising:
i) an elongate mounting member which is elongated along a longitudinal direction, and
ii) a supplementary extension mechanism which is arranged at an end of the elongate mounting member, the supplementary extension mechanism being operable between:
i) a retracted state and ii) at least one extended state, the supplementary extension mechanism comprising:
i) a supplementary actuator rotatable about a supplementary rotation axis, the supplementary rotation axis being substantially perpendicular to the longitudinal direction,
ii) a supplementary sliding portion arranged to translate along the longitudinal direction with respect to the elongate mounting member,
iii) a supplementary conversion mechanism configured to convert a rotation of the supplementary actuator into a translatory movement of the supplementary sliding portion along the longitudinal direction from the retracted state to an extended state and vice versa, and
wherein the supplementary extension mechanism is arranged to abut one of the opposing mounting surfaces.

A third object is to provide a battery assembly intended to supply power to an electric motor in order to wind and unwind a covering member of an architectural covering, the battery assembly comprising:
i) a rechargeable battery pack for storing energy,
ii) an output connector for connection to the electric motor, and
iii) a charger plug configured to connect the rechargeable battery pack to a recharging power source,
wherein the rechargeable battery pack is configured to be completely accommodated in an elongate mounting member, e.g. a headrail, belonging to a mounting element of the architectural covering.

All of the afore-mentioned objects and embodiments may form the subject-matter of a claim to patent protection, either in combination or independently.

This summary is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be claimed separately or in combination with aspects and features of that embodiment or any other embodiment. All of the embodiments and aspects mentioned in this disclosure may hence form the subject-matter of a claim to patent protection, either in combination or independently.

This summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular embodiments or arrangements illustrated herein.

BRIEF DESCRIPTION OF THE DRAWINGS

Further features, aspects, and advantages of the present disclosure will also become apparent from the following detailed description of embodiments, when read in conjunction with the exemplary drawings in which:

FIG. 1 is a schematic perspective view of a mounting element according to a first embodiment of the first object where an extension mechanism is placed in a retracted state;

FIG. 2 is a view similar to FIG. 1, where the extension mechanism is moving into an extended state;

FIG. 3 is a view similar to FIG. 1, where the extension mechanism is placed in an extended state;

FIG. 4 is a schematic perspective view of a part of an architectural covering and comprising the mounting element of FIG. 1;

FIG. 5 is a schematic partly sectioned perspective view, along arrow V at FIG. 4;

FIG. 6 is a schematic exploded perspective view of an extension mechanism belonging to the mounting element of FIG. 1;

FIG. 7 is a view, on a larger scale, of detail VII at FIG. 6;

FIG. 8 is a view, on a larger scale, of detail VIII at FIG. 6;

FIG. 9 is a schematic assembled perspective view of the extension mechanism of FIG. 6;

FIG. 10 is a schematic top view of an elongate mounting member belonging to the mounting element of FIG. 1;

FIG. 11 is a schematic front view of the elongate mounting member of FIG. 10;

FIG. 14 is a schematic sectional view, in a plane parallel to the longitudinal direction, of the extension mechanism of FIG. 9 placed in an extended state;

FIG. 15 is a schematic sectional view of part of a mounting element according to a second embodiment of the first object where an extension mechanism is placed in a retracted state;

FIG. 16 is a schematic sectional view of part of a mounting element according to a third embodiment of the first object where an extension mechanism is placed in a retracted state;

FIG. 17 is a schematic top perspective view of a part of the mounting element of FIG. 1 and a supplementary extension mechanism according to a second object placed in an retracted state close to an opposing mounting surface;

FIG. 18 is a view similar to FIG. 17, where the supplementary extension mechanism is placed in an extended state;

FIG. 19 is schematic bottom perspective view of the part of the mounting element of FIG. 17;

FIG. 20 is schematic bottom perspective view of the part of the mounting element of FIG. 18;

FIG. 21 is a schematic assembled perspective view of the supplementary extension mechanism;

FIG. 22 is a schematic exploded perspective view of the supplementary extension mechanism of FIG. 21;

FIG. 23 is a schematic perspective view of a component belonging to the supplementary extension mechanism of FIG. 21;

FIG. 24 is a schematic cross-section, along plane XXIV at FIG. 23, of the component of FIG. 23;

FIG. 25 is a schematic cross-section, along plane XXV at FIG. 17, where the supplementary extension mechanism is placed in an retracted state close to an opposing mounting surface;

FIG. 26 is a view similar to FIG. 25, where the supplementary extension mechanism is heading for its extended state;

FIG. 27 is a view similar to FIG. 25, where the supplementary extension mechanism is placed in its extended state;

FIG. 28 is a schematic top partly exploded perspective view of the mounting element of FIG. 1 and a battery assembly according to a third object;

FIG. 29 is a schematic top perspective view of the mounting element of FIG. 28 showing the battery of FIG. 28 in an assembled state;

FIG. 30 is an enlarged view of detail XXX at FIG. 29;

FIG. 31 is a schematic top perspective view, along a direction opposite to FIG. 31, of the detail XXX;

FIG. 32 is a schematic bottom perspective view of the mounting element of FIG. 29;

FIG. 33 is a schematic view similar to FIG. 12 of a mounting element according to a fourth embodiment of the first object;

FIG. 34 is a schematic view similar to FIG. 13 of the mounting element of FIG. 33;

FIG. 35 is a schematic top view along direction XXXV at FIG. 33;

FIG. 36 is a schematic top view along direction XXXVI at FIG. 34;

FIG. 37 is a schematic exploded view of a mounting element according to a fifth embodiment of the first object;

FIG. 38 is an enlarged view of the right-hand side of FIG. 37;

FIG. 39 is a schematic perspective view of a part of an architectural covering and comprising a mounting element according to a sixth embodiment of the first object;

FIG. 40 is a schematic sectional view, in plane XXXX at FIG. 39, of the mounting element of FIG. 39 in an installed configuration;

FIG. 41 is a side view of a component of the mounting element of FIG. 39;

FIG. 42 is a partially exploded view of the mounting element of FIG. 39;

FIG. 43 is a top view of the mounting element of FIG. 39;

FIG. 44 is a schematic perspective view of a part of an architectural covering and comprising a mounting element according to a seventh embodiment of the first object;

FIG. 45 is a schematic sectional view, in a plane perpendicular to the longitudinal direction at FIG. 39, of the mounting element of FIG. 44 in an installed configuration;

FIG. 46 is a perspective view of the mounting element of FIG. 44; and

FIG. 47 is a top view of the mounting element of FIG. 39.

Figure 12:
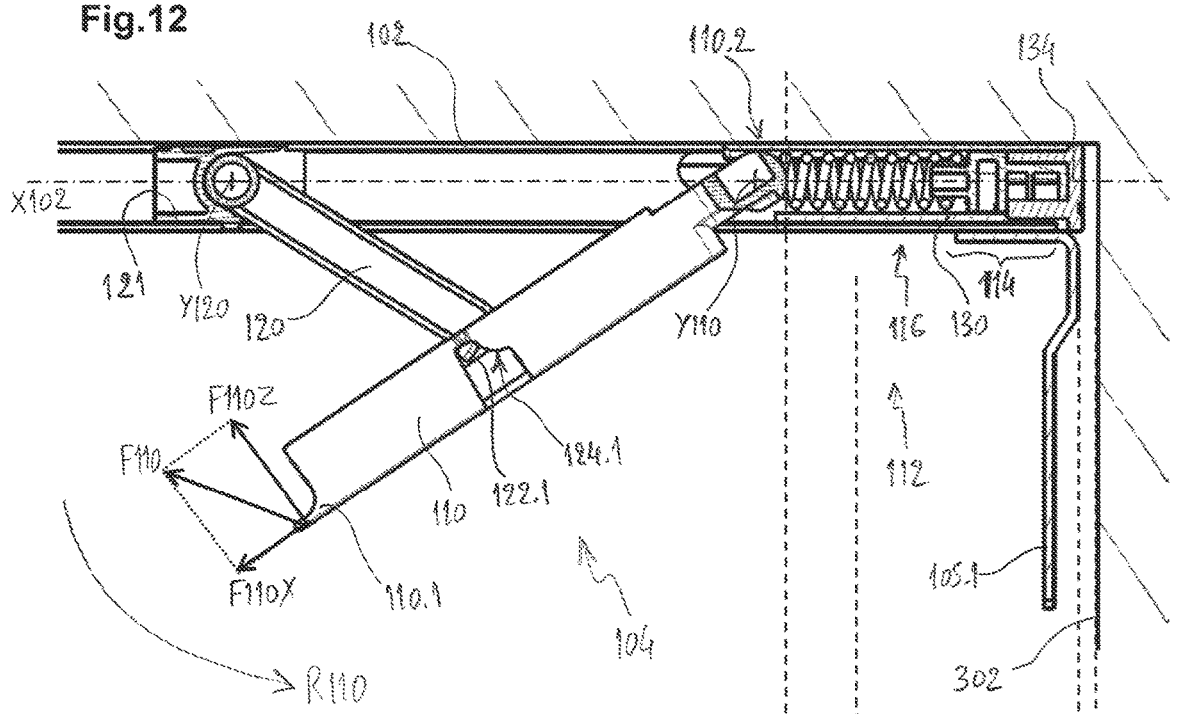
FIG. 12 is a schematic sectional view, in a plane including the longitudinal direction, of the extension mechanism of FIG. 9 placed in a retracted state.

The accompanying drawings are provided for purposes of illustration only, and the dimensions, positions, order, and relative sizes reflected in the drawings attached hereto may vary. The detailed description will be better understood in conjunction with the accompanying drawings. Reference now will be made in detail to embodiments of the present subject matter, one or more examples of which are illustrated in the drawings. Each example is provided by way of explanation of the present subject matter, not limitation of the present subject matter. In fact, it will be apparent to those skilled in the art that various modifications and variations can be made in the present disclosure without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the appended claims and their equivalents.

DETAILED DESCRIPTION

The afore-mentioned and other features and advantages of the present disclosure will be readily apparent from the following detailed description, the scope of the invention being set out in the appended claims.

In an improvement according to the afore-detailed first object, the actuator enables a user to easily fasten the mounting element supporting a covering between two opposing mounting surfaces. Indeed, the user only needs to grasp the actuator and rotate it to place the extension mechanism in the extended state. With one hand a user can hold the mounting element at its mounting position and, with its other hand, the user can operate the actuator so as to fasten the mounting element between two opposing mounting surfaces.

Once fastened, the mounting element achieves a force fit (frictional fit) between two opposing mounting surfaces. The mounting element may alternatively or complementarity achieve a form fit, for example if one of the opposing mounting surfaces has matching female or male reliefs.

According to an aspect, the rotation axis is transverse to the longitudinal direction, when viewed in a plane parallel to the longitudinal direction. The rotation axis may form an angle ranging from 80 degrees to 100 degrees with respect to the longitudinal direction. For example, the rotation axis may be orthogonal to the longitudinal direction, in which case the actuator rotates along a plane which includes the longitudinal direction.

According to an aspect, the rotation axis may intersect the longitudinal direction. Alternatively, the rotation axis may not intersect the longitudinal direction.

The elongate mounting member can withstand the weight of the whole architectural covering and withstand the forces resulting from the extension mechanism being in the extended state. Advantageously, the elongate mounting member is rigid or stiff enough to sustain the architectural covering while spanning the gap between the opposing mounting surfaces.

According to an aspect, the elongate mounting member is made of a single component. Thus, the mounting element can form a rail, for example a headrail. Alternatively to this aspect, the elongate mounting member may be made of several parts coupled together.

The components of the extension mechanism may be composed of metallic and/or of plastic materials.

Throughout the present application the term "along" means either substantially "parallel to" or substantially "collinear with".

According to an embodiment, the conversion mechanism may further comprise a compression part configured to transmit a compression force along the longitudinal direction towards the opposing mounting surface.

Thus, the translatory movement of conversion mechanism makes it possible to frictionally hold the mounting element between the two opposing mounting surfaces.

According to an aspect of this embodiment, the compression part may substantially have a prismatic shape extending along a longitudinal direction. The compression part may comprise an abutment part arranged to receive an end of the biasing part. Alternatively, the compression part may substantially have a cylindrical shape extending along a longitudinal direction.

According to an embodiment, the conversion mechanism may comprise a biasing part mechanically connected to the actuator, the biasing part being configured to generate the compression force when the extension mechanism is in the extended state.

Thus, such a biasing part can easily generate the compression force by simply being elastically deformed by the actuator.

According to an aspect of this embodiment, the biasing part may be elastically deformable and configured to be more stressed when the extension mechanism is in the extended state than in the retracted state so as to generate the compression force.

According to an aspect of this embodiment, the biasing part may be selected to have a deformation distance ranging from 10 mm to 100 mm, the deformation distance being measured as the length difference of the biasing part between the extended state and the retracted state.

According to an aspect of this embodiment, the compression part and the biasing part may be separate components. Alternatively, the compression part may be integral with the biasing part. For example, the compression part and the biasing part may be made of one-piece, for example composed of an elastomeric material.

According to an aspect of this embodiment, the biasing part may comprise at least one compression spring.

According to an embodiment, the biasing part may comprise at least two compression springs arranged in parallel and preferably laterally spaced apart from each other.

Thus, parallel compression springs make it possible to minimize the overall dimension of the mounting element along the longitudinal direction.

The/each compression spring may comprise a helical spring, which can be easily designed and assembled into the extension mechanism and which can have a very long service life.

Alternatively, the compression spring may be comprised of an elastomeric material.

According to an aspect of this embodiment, the conversion mechanism may further comprise at least one ring arranged between the actuator and the at least one compression spring. Such a ring may be configured to maximize the interface between the actuator and the at least one compression spring. In service, such a ring hence distributes the reaction force of the biasing part on the actuator.

According to an embodiment, the actuator may directly actuate the biasing part.

Thus, the extension mechanism can be very compact.

Alternatively, the actuator may indirectly actuate the biasing part, for example where the extension mechanism comprises at least one intermediary component interposed between the actuator and the biasing part.

According to an embodiment, the compression part may be configured so as to transmit, towards an opposing mounting surface, a compression force that is applied below the longitudinal centerline of the elongate mounting member, when the extension mechanism reaches its extended state.

According to an embodiment, the conversion mechanism may further comprise a connection member mechanically linked:
  i) to the elongate mounting member so as to rotate between the retracted state and the extended state, and
  ii) to the actuator so as to guide the actuator in rotation.

Thus, such a connection member can guide in rotation the actuator and facilitate the implementation of the actuator into the extension mechanism.

According to an embodiment, the actuator and the connection member may have substantially elongated shapes, the actuator and the connection member being substantially parallel when the extension mechanism is in the extended state.

Thus, such elongated actuator and connection member help keep the extension mechanism compact when viewed in a plane perpendicular to the longitudinal direction.

According to an aspect of this embodiment, the connection member may be a rod.

According to an embodiment, the connection member may be hinged to the elongate mounting member so as to rotate about a connection axis which is orthogonal to the longitudinal direction.

Thus, such a hinged connection member can easily be moved between the retracted state and the extended state.

Alternatively, the connection member may be linked to the elongate mounting member so as to move, concomitantly to its rotation, in translation along the longitudinal direction.

According to an embodiment, the connection member and the actuator may be linked by means of at least: i) a linkage pin and ii) a curvilinear bearing portion arranged to guide the at least one linkage pin.

Thus, such linkage pin and curvilinear bearing portion form an inexpensive yet accurate rotatable link between the connection member and the actuator.

According to an aspect of this embodiment, the connection member and the actuator may be linked by means of two linkage pins and two curvilinear bearing portions arranged to respectively guide the linkage pins.

According to an aspect of this embodiment, the curvilinear bearing portion may have the form of a circular arc. For example, the circular arc may extend over an angle ranging from 45 degrees to 120 degrees.

According to an embodiment, the linkage pin may protrude on a lateral face of the connection member, and the curvilinear bearing portion may extend on a side face of the actuator Alternatively, the linkage pin may protrude on a side face of the actuator and the curvilinear hearing portion may extend on a lateral face of the connection member.

According to an aspect, the extension mechanism may be arranged in the extended state such that the actuator is locked against its rotation from the extended state to the retracted state.

According to an embodiment, the actuator, the biasing part, and the connection member may be arranged so that the biasing part exerts a locking torque on the actuator about the connection axis, said locking torque being oriented counter the rotation direction of the actuator from the extended state to the retracted state.

Thus, such an arrangement prevents the extension mechanism from unwittingly returning into the retracted state once it has been placed by the user in the extended state.

According to an aspect of this embodiment, the actuator, the biasing part, and the connection member may be arranged such that:
  the mechanical link between the actuator and the connection member is located on the other side,
  with respect to the mechanical link between the actuator and the connection member when the extension mechanism is in the extended state,
  of a segment connecting: a) the center of rotation of the connection member relative to the elongate mounting member, to b) the point of the actuator where is exerted the resultant of the reaction force generated by the biasing part.

According to an embodiment, the actuator may be at least partly arranged between the connection member and the biasing part.

According to an aspect of this embodiment, the guide may be configured to guide the compression part in translation along the longitudinal direction.

According to an embodiment, the actuator may have a pushing portion arranged to push the conversion mechanism, the pushing portion being moveable in translation along the longitudinal direction and in rotation.

According to au embodiment, the conversion mechanism may further comprise a guide having at least one guiding slot which extends at least partly along the longitudinal direction, and the actuator further may comprise at least one pin configured to slidingly and rotatably move in the at least one guiding slot.

Thus, such pin and guiding slot enable translation and rotation of the actuator.

Throughout the present application the adjective "longitudinal" characterizes an element, for example the guiding slot, which extends substantially parallel to the longitudinal direction along which the elongate mounting member is elongated.

According to an aspect of this embodiment, the guide may have two guiding slots arranged on two sides of the guide, and the actuator may have two pins configured to slidingly and rotatably move respectively in the two guiding slots.

According to an aspect of this embodiment, the at least one guiding slot fully extends along the longitudinal direction.

According to an embodiment, the actuator may be configured to be manually movable. Thus, a user can move the actuator manually in order to operate the extension mechanism between the retracted state and the extended state. According to an aspect, the actuator may comprise a lever. Such a lever may be formed by an elongate component, like an elongate profile. As the actuator is rotatable with respect to the elongate mounting member, the lever provides a lever arm to operate the conversion mechanism.

According to an aspect of this embodiment, the actuator may comprise a control portion which is arranged for an actuation of the actuator.

Thus, such a control portion makes it easy for a user to grasp and operate the actuator.

According to an aspect of this embodiment, the control portion may be distant from the pushing portion. For example, the pushing portion may be located on one end of the actuator whereas the control portion may be located in a median region of the actuator or on the other end of the actuator.

According to an embodiment, the actuator may protrude from the elongate mounting member when the extension mechanism is in the retracted state.

Thus, a user can easily reach for the actuator in order to place the extension mechanism in its extended state.

According to an embodiment, the connection member may herein comprise a rod.

According to an embodiment, the mounting element may further comprise a friction member arranged on an outer end portion of the extension mechanism so as to bear against the opposing mounting surfaces when the extension mechanism is in the extended state, the friction member being mechanically linked to the conversion mechanism such that the friction member converts a part of the translatory movement into an upwardly-oriented friction force when the friction member bears against the two opposing mounting surfaces.

Thus, such a friction member makes it possible to fasten the mounting element between two opposing mounting surfaces, because of the upwardly-oriented friction force.

According to an aspect of this embodiment, the friction member may be arranged to protrude from the outer end portion of the extension mechanism when the extension mechanism is in the extended state. However, depending on the play between the opposing mounting surfaces and the mounting element, the friction member may protrude only on a small scale.

According to an aspect of this embodiment, the friction member may be composed of at least one friction material selected within the group consisting of elastomers and plastics. Alternatively to this aspect, the friction member may be composed of another material provided the friction member has a surface roughness selected to convert the translatory movement into the upwardly-oriented friction force. The friction member may be elastic or resilient due to its material and/or due to its shape.

Alternatively to this embodiment, a friction pad may already be secured to the opposing mounting surfaces, for example by means of double-sided tape or glue, in which case the mounting element does not need to comprise a friction member.

According to an aspect of this embodiment, the friction member may be integral with the compression part. According to an aspect of this embodiment, the friction member and the compression part may be made as a single piece.

According to an aspect of this embodiment, the friction member may be secured directly to the compression part. Alternatively to this aspect, at least one element may be interposed between the friction member and the compression part, in which case the friction member may be secured indirectly to the compression part.

Alternatively to this embodiment, the friction member and the compression part may be separate components.

According to an embodiment, the elongate mounting member may comprise a housing part configured to substantially accommodate the extension mechanism in the extended state.

Thus, such a housing part enables design of a compact mounting element. Furthermore, such a housing part protects the actuator and the connection member.

The elongate mounting member may advantageously be configured to hold all the components of the architectural covering. In particular, the elongate mounting member may hold the extension mechanism, a covering member, and an electric motor for winding and unwinding the covering member.

According to an aspect of this embodiment, the housing part may be configured to fully accommodate the extension mechanism in the extended state.

According to an aspect, the mounting element may further comprise a supplementary friction member arranged on an end portion of the elongate mounting member opposite the extension mechanism so as to bear against the opposing mounting surfaces, the supplementary friction member being configured to convert a part of the translatory movement into an upwardly-oriented friction force when the supplementary friction member bears against the opposing mounting surfaces.

According to an aspect, the elongate mounting member may comprise mounting clips arranged to help mount, for example, a horizontal blind or a roman blind onto the mounting element so as to install an architectural covering.

Thus, the actuator enables a user to easily fasten the mounting element between two opposing mounting surfaces. Indeed, the user only needs to impart the force to the actuator so as to place the extension mechanism in the extended state. With one hand a user can hold the mounting element at its mounting position and, with its other hand, the user can impart the force to the actuator such that the extension mechanism abuts one of the opposing surfaces, so as to fasten the mounting element in the architectural recess.

Furthermore, another object is an architectural covering comprising a covering member for covering an architectural opening, wherein the architectural covering is equipped with a mounting element according to the present disclosure. Thus, such an architectural covering can be quickly and reliably installed by hand, hence without tool, within an architectural recess having two opposing mounting surfaces.

In an improvement according to the afore-detailed second object, the supplementary extension mechanism may comprise a supplementary compression part configured to transmit a compression force along the longitudinal direction towards the opposing mounting surface. Such a compression force helps hold the mounting element, because it helps generate a friction force against the opposing mounting surfaces.

According to an aspect, the supplementary compression part may have a prismatic shape extending along the longitudinal direction. In particular, the translatory movement of the supplementary extension mechanism may develop along the longitudinal direction.

According to an aspect, the supplementary conversion mechanism may be configured to cooperate with the supplementary actuator. In a particular aspect, the supplementary conversion mechanism may comprise a driven portion, which is last in translation with the supplementary sliding portion, and several driving surfaces which are fast in rotation with the supplementary actuator and which are configured to cooperate selectively with driven portion.

According to a further aspect, the driven portion may have a semi-cylindrical male cross-section, the shape of which is substantially complementary to each one of the driving surfaces, such that each one of the driving surfaces may selectively drive the driven portion in translation along a longitudinal direction. In a particular aspect, the driving surfaces may be arranged such that each one of the driving surfaces extends substantially perpendicularly to its adjacent driving surfaces.

According to a further aspect, the supplementary actuator may have an actuating portion configured to actuate the supplementary actuator. In a particular aspect, the actuating portion may have a slot configured to receive a tool, for example a screwdriver, such that a user may exert a torque on the tool to impart rotation to the supplementary actuator about the supplementary rotation axis, selectively clockwise or counterclockwise. Advantageously, the elongate mounting member may have an opening, e.g. a hole, configured to make the slot accessible to a tool from outside, say from under, the elongate mounting member.

According to a further aspect, the supplementary actuator is configured such that the slot has a geometric center substantially located on the rotation axis, the driving surfaces being located at different respective distances from the geometric center. As a result, when the driven portion bears against a given driving surface, the outer end of the supplementary compression part is further from the opposing mounting surface than when the driven portion bears against another driving surface.

According to an aspect, the supplementary actuator may comprise a ratchet wheel having several notches on its periphery, the supplementary conversion mechanism may comprise at least one pawl, e.g. two pawls, configured to fall within the notches, the ratchet wheel and the or each pawl being configured to cooperate such that the or each pawl may fall into a respective notch, so as to prevent rotation of the supplementary actuator.

In a particular aspect, the or each pawl may selectively release the ratchet wheel, such that the supplementary actuator may rotate about the supplementary rotation axis. In a particular aspect, the ratchet wheel and the or each pawl are configured so as to define four discrete, stable positions of the supplementary actuator about the supplementary rotation axis, the discrete, stable positions being defined such that two successive driving surfaces are separated by a 90 degree angle.

In an improvement according to the afore-detailed third object, the rechargeable battery pack may be comprised of several batteries which may be arranged in a series, parallel or a mixture thereof.

According to an aspect, the rechargeable battery pack may be secured to elongate mounting member so as to prevent the user from removing the rechargeable battery pack out of the elongate mounting member. Advantageously, the battery assembly may comprise securing elements configured to secure the rechargeable battery pack to the elongate mounting member in a non-detachable manner. In a particular aspect, the elongate mounting member may have a housing space configured to accommodate totally or partially the rechargeable battery pack.

According to an aspect, the elongate mounting member may be configured so that the charger plug is accessible from outside the elongate mounting member. Advantageously, the elongate mounting member may comprise a hole for accessing the charger plug.

Thus, when the rechargeable battery pack needs to be recharged, the user may: i) either plug in a charger while the mounting element remains mounted, ii) or remove the whole mounting element and displace it to get the rechargeable battery pack recharged at a dedicated charging installation.

As an additional or independent object of the present invention, the application is also directed to a mounting element, for mounting an architectural covering between two opposing mounting surfaces, the mounting element comprising an elongate mounting member, which is elongated along a longitudinal direction, and an extension mechanism, which may be arranged at an end of the elongate mounting member, the extension mechanism being operable between: i) a retracted state, and ii) an extended state, wherein the extension mechanism may comprise a compression part, wherein the compression part may be configured so as to transmit, towards au opposing mounting surface, a compression force that is applied below the longitudinal centerline of the elongate mounting member, when the extension mechanism reaches its extended state.

According to an embodiment, the extension mechanism includes a conversion mechanism which may be equipped with the compression part, the compression part being configured to transmit a compression force along the longitudinal direction towards the opposing mounting surface.

According to an embodiment, the mounting element may include a lateral flange, which is configured to come out of a front side of the recess. Optionally, the lateral flange may be configured to extend along an upper front surface of the wall the recess is located in.

According to an aspect, the lateral flange may be configured to connect the elongate mounting member to the covering member. Further, the lateral flange may be configured to support the covering member above the level of the elongate mounting member when the mounting element is fastened to the opposing mounting surfaces. The covering member and the elongate mounting member may extend along respective axes which are offset in a direction perpendicular the longitudinal direction. Thus, the covering member can be mounted above and in front of the recess. Thus, the windows may be opened inwards and under the rolled-up covering member. Also, the covering member may extend beyond the opposing mounting surfaces both in the longitudinal direction and on top of the recess. Thus, a length of the covering member may be larger than a length of the recess. This ensures there is no or minimal light gap around the side edges of the covering member.

According to an aspect, the architectural covering may be mounted between the opposing mounting surfaces. The elongate mounting member may extend along the longitudinal direction.

According to an aspect, the lateral flange may be integral, advantageously one-piece, with the elongate mounting member. The lateral flange may be substantially comprised of a plate, which extends vertically when the mounting element is fastened to the opposing mounting surfaces. Alternatively, the lateral flange and the elongate mounting member may be two separate components that are coupled by suitable fastening elements. Such suitable fastening elements may form a permanent coupling, like rivets, or a dismountable coupling, like bolts. Alternatively, the lateral flange and the elongate mounting member may be fastened by snap fit or friction fit, thus without separate, additional fastening elements.

According to an aspect, the covering member may be a roller blind. Alternatively, the covering member may be a Venetian blind, a pleated blind, a honeycomb blind, roman shades etc.

According to an aspect, the lateral flange may be configured to support an covering member beside, e.g. level with, the elongate mounting member when the mounting element is fastened to the opposing mounting surfaces. The lateral flange may be configured to protrude away from the recess when the mounting element is fastened to the opposing mounting surfaces. For example, the lateral flange may extend substantially horizontally or obliquely upwards.

According to an aspect, the mounting element may include two holding flanges, which are configured to couple the lateral flange to the covering member so as to hold the covering member. Each one of the holding flanges may substantially include a holding portion, which is configured to hold a respective end of the covering member. The holding portions may include brackets or clips. Each one of holding flanges may substantially include a coupling portion, which is configured to be coupled to the lateral flange. The longitudinal ends of the lateral flange may define two respective slots, which open outwards and are configured to receive a respective coupling portion. Each one of the holding flanges may substantially have an L-shape, which is defined by the holding portion and the coupling portion which respectively extend perpendicularly to each other.

In service, in order to assemble coupling portions to the lateral flange, an operator may insert the coupling portions respectively into the slots in the longitudinal direction. Each coupling portion may have a tapered end portion in order to facilitate the insertion into the respective slot. Each coupling portion may have abutment surfaces that are arranged to abut on respective edges of the lateral flange, so as to stop the respective coupling portion at a predetermined position in the longitudinal direction.

According to an aspect, the edges of the coupling portions may have indentations arranged to secure each coupling portion to the lateral flange. For example, the indentations may allow the lateral flange to be plastically deformed into the indentations so as to permanently fasten the coupling portions to lateral flange. In a oat shown alternative embodiment, the indentations may cooperate with an elastically deformable part of the lateral flange so as to clip the coupling portions to the lateral flange.

According to an aspect, the covering member may be a Venetian blind. Further, the mounting element may include two supporting flanges, which are configured to support the covering member. Each supporting flange may be fastened to the lateral flange by any suitable fastening element, e.g. screws, rivets or welds. The supporting flanges may be configured to cooperate by clipping into a frame of the venetian blind and have at least one lever configured to release the clipping connection.

Some embodiments will now be described with reference to the exemplary drawings, in which like reference signs refer to like parts or features.

FIGS. 1 to 5 depict a mounting element 101 for mounting an architectural covering 200 in an architectural recess 300 which is formed by a window opening frame having two opposing mounting surfaces 302 and 304. The architectural covering 200 comprises the mounting element 101. The mounting element 101 comprises an elongate mounting member 102 and an extension mechanism 104.

The elongate mounting member 102 is configured to mount the architectural covering 200 between opposing mounting surfaces 302 and 304. In the illustrated embodiment, elongate mounting member 102 holds all the components of architectural covering 200, in particular the extension mechanism 104, a covering member 202 and a not shown electric motor for winding and unwinding the covering member 202.

Elongate mounting member 102 is elongated along a longitudinal direction X102 extending across architectural recess 300, such that elongate mounting member 102 substantially spans the distance between the opposing mounting surfaces 302 and 304, hence the length of architectural recess 300. Hence, elongate mounting member 102 extends between the two opposing mounting surfaces 302 and 304.

In the illustrated embodiment, elongate mounting member 102 is made of a single component which has an overall prismatic shape extruded along longitudinal direction X102. Thus, mounting element 101 can form a rail, for example a headrail. Alternatively, the elongate mounting member may be made of several parts attached together. FIG. 11 depicts an exemplary cross-section of elongate mounting member 102. The exemplary cross-section of elongate mounting member 102 substantially has the form of a rectangle with stiffening webs extending along longitudinal direction X102. Throughout the present disclosure, the term "along" means either "parallel to" or "collinear with".

In the example of FIGS. 1 to 14, mounting element 101 forms a headrail. Elongate mounting member 102 may be stiff enough to withstand the weight of the whole architectural covering 200 and the forces resulting from extension mechanism 104 being in the extended state. Elongate mounting member 102 may be composed of extruded aluminum.

As depicted in FIGS. 1 and 4, mounting element 101 further comprises two flanges 105.1 and 105.2 which are configured to hold some of the components of architectural covering 200, like covering member 202. Flanges 105.1 and 105.2 are respectively attached to the ends of elongate mounting member 102.

Figure 13:
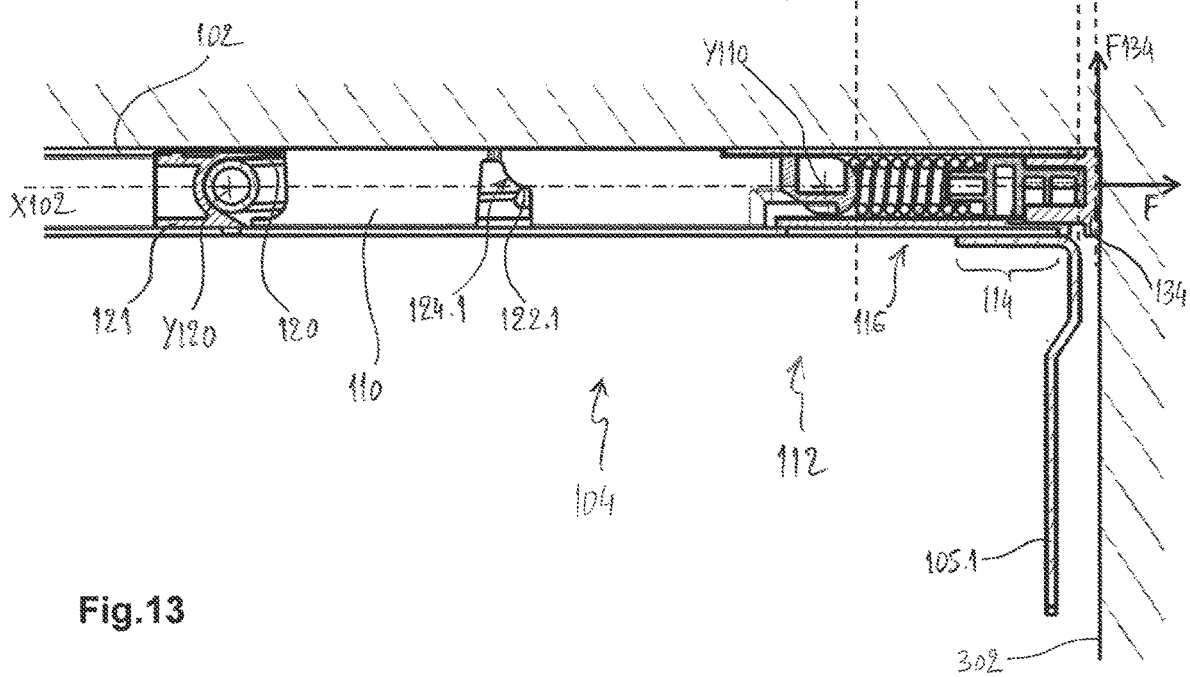
FIG. 13 is a schematic sectional view, in a plane including the longitudinal direction, of the extension mechanism of FIG. 9 placed in an extended state.

The extension mechanism 104 may be arranged at an end 106 of the elongate mounting member 102, as shown in FIGS. 2 to 4. Extension mechanism 104 may be operable between: i) a retracted state, as shown in FIGS. 1 and 12, and ii) an extended state, as shown in FIGS. 3 and 13. When the extension mechanism 104 is in the extended state, the mounting element 101 may be fastened to the opposing mounting surfaces 302 and 304, as shown in FIG. 13, so as to mount architectural covering 200 between opposing mounting surfaces 302 and 304.

When the extension mechanism 104 is in the retracted state (FIG. 12), the mounting element 101 is in a release configuration. When the extension mechanism 104 is in the extended state (FIG. 13), the mounting element 101 is in a fastening configuration.

As shown in FIGS. 6, 7 and 8, the extension mechanism 104 may comprise an actuator 110 and a conversion mechanism 112. Extension mechanism 104 may further comprise a compression part 114, as depicted in FIGS. 5, 6, 12, and 13. The components of extension mechanism 104 may be composed of metallic and/or of plastic materials.

The actuator 110 may protrude from elongate mounting member 102 when the extension mechanism 104 is in the retracted state (FIGS. 1 and 12). The actuator 110 may be rotatable (compare FIGS. 1 and 3) about a rotation axis Y110 which is perpendicular to the longitudinal direction X102. In the example of FIGS. 12 and 13, the angle of rotation of the actuator 110 about rotation axis Y110 is about 40 degrees between the retracted and extended states of the extension mechanism 104. Rotation axis Y110 is herein transverse to longitudinal direction X102 when viewed in a plane parallel to longitudinal direction X102.

Rotation axis Y110 may form an angle ranging from 80 degrees to 100 degrees with the longitudinal direction. For example, rotation axis Y110 is herein orthogonal to longitudinal direction X102, such that actuator 110 rotates along a plane which includes longitudinal direction X102. The rotation axis may be intersect the longitudinal direction X102. Alternatively, the rotation axis may not intersect the longitudinal direction X102.

As shown in FIGS. 7, 9, and 12, actuator 110 comprises a control portion 110.1 which is arranged for manually actuating actuator 110. In order to operate actuator 110 a user can grasp the control portion 110.1 and then push the actuator 110 as a lever.

The actuator 110 may rotate along an actuator plane which includes the longitudinal direction X102 and which is vertical when extension mechanism 104 is in the extended state. In the example of FIGS. 1 to 12, the rotation axis Y110 is orthogonal to the longitudinal direction X102. The actuator plane corresponds to the plane of FIG. 12.

The conversion mechanism 112 is configured to convert a rotation of actuator 110 into a translatory movement of rotation axis Y110 along the longitudinal direction X102 from the retracted state to the extended state and vice versa. In the example of FIGS. 1 to 14, the translatory movement of extension mechanism 104 develops along the longitudinal direction X102. The extension mechanism 104 is arranged to abut one of the opposing mounting surfaces 302 and 304 in the extended slate when the mounting element 101 is mounted between the opposing mounting surfaces 302 and 304.

As visible when comparing FIGS. 12 and 13, the compression part 114 of the extension mechanism 104 translates towards opposing mounting surface 302 (to the right). In other words, extension mechanism 104 extends in translation (X102) towards opposing mounting surface 302 when the extension mechanism 104 is moved from its retracted state (FIG. 12) to its extended state (FIG. 13).

As depicted in FIGS. 1 and 12, actuator 110 is displaceable, for example manually, by a force F110 having a component F110Z which is orthogonal to the longitudinal direction X102. In the example of FIG. 12, force F110 also has a component F110X which is parallel to the longitudinal direction X12.

Conversion mechanism 112 is configured to convert the displacement of the actuator 110, actually a rotation about rotation axis Y110, due to orthogonal component F110Z, into a translatory movement of rotation axis Y110 towards opposing mounting surface 302 and from the retracted state to the extended state. In its extended state the extension mechanism 104 abuts one of the opposing mounting surfaces 302 and 304 when the mounting element 101 is mounted between the opposing mounting surfaces 302 and 304.

Compression part 114 is configured to transmit a compression force F along the longitudinal direction X102 towards the opposing mounting surface 302, as shown in FIG. 13. Compression part 114 may substantially have a prismatic shape extending along longitudinal direction X102. Alternatively, the compression part may substantially have a cylindrical shape extending along longitudinal direction.

When the architectural covering 200 is in its service position, the compression force F may be oriented substantially horizontally and towards the architectural recess 300, more particularly towards opposing mounting surface 302. The compression force F makes it possible to hold mounting element 101 in the architectural recess 300 between opposing mounting surfaces 302 and 304, because compression force F helps generate a friction force, as described further below.

The conversion mechanism 112 comprises a biasing part 116 which is mechanically coupled with actuator 110. Biasing part 116 may be configured to generate the compression force F when the extension mechanism 104 is in the extended state (FIG. 13). In the embodiment of FIGS. 1 to 14, biasing part 116 is located on a longitudinal end of mounting element 101. The actuator 110 may directly actuate biasing part 116. Thus, extension mechanism 101 can be very compact. Alternatively, the actuator may indirectly actuate tire biasing part, for example where the extension mechanism comprises at least one intermediary component interposed between the actuator and the biasing part.

Biasing part 116 may be a component distinct or separate from compression part 114. Alternatively, the compression part may be integral with the biasing part and, for example, be made one-piece and composed of an elastomeric material.

In the illustrated embodiment, compression part 114 comprises an abutment part 115 which is arranged to receive an end of the biasing part 116. Biasing part 116 may comprise at least one compression spring. In the illustrated embodiment, biasing part 116 comprises two compression springs 116.1 and 116.2, which are herein arranged in parallel and laterally spaced apart from each other. Thus, the parallel compression springs 116.1 and 116.2 make it possible to minimize the overall dimension of mounting element 101 along longitudinal direction X102.

Each compression spring 116.1 or 116.2 may be comprised of a helical spring, which can be easily designed and assembled into extension mechanism 101 and which can have a very long service life. Alternatively, the compression spring may be comprised of an elastomeric material. The abutment part 115 has two cylindrical protrusions 115.1 and 115.2 which are configured to hold respectively the outer ends of springs 116.1 and 116.2.

According to a not shown aspect, the conversion mechanism may further comprise at least one ring arranged between the actuator and the at least one compression spring. Such a ring may be configured to maximize the interface between the actuator and the at least one compression spring. In service, such a ring can hence distribute the reaction force of the biasing part on the actuator.

Biasing part 116 may be elastically deformable and configured to be more stressed when extension mechanism 104 is in the extended state (FIGS. 3 and 13) than in the retracted state (FIGS. 1 and 12) so as to generate the compression force F. The clastic deformation of biasing part 116 results from the length difference of the biasing part 116 between the extended state (FIG. 13) and the retracted state (FIG. 12). The biasing part may be selected to have a deformation distance ranging from 10 mm to 100 mm, for example of 50 mm, the deformation distance being measured as the length difference of the biasing part 116 between the extended state and the retracted state of extension mechanism 104.

Conversion mechanism 112 may further comprise a connection member 120 which is mechanically linked to the elongate mounting member 102 so as to rotate between the retracted state and the extended state, and to the actuator 110 so as to guide actuator 110 in rotation. Connection member 120 is intended to guide in rotation actuator 110 and facilitate its implementation into extension mechanism 104.

On the one hand, connection member 120 may be hinged to the elongate mounting member 102 so as to rotate about a connection axis Y120 which is orthogonal to the longitudinal direction X102, when extension mechanism 104 is displaced between the retracted state (FIGS. 1 and 12) and the extended state (FIGS. 3 and 13). In the example of FIGS. 12 and 13, the angle of rotation of the connection member 120 about connection axis Y120 is about 30 degrees between the retracted and extended states of the extension mechanism 104. Thus, the connection member can easily be moved between the retracted state and the extended state. Alternatively (not shown), the connection member may be linked to the elongate mounting member so as to move, concomitantly to its rotation, in translation along the longitudinal direction.

Mounting element 101 further comprises a hinge 121 which is configured to swingably link connection member 120 to elongate mounting member 102. Connection member 120 can easily be moved between the retracted state and the extended state. The hinge 121 may be fastened to the elongate mounting member 102, such that hinge 121 does not translate relative to elongate mounting member 102.

On the other hand, the connection member 120 is linked to actuator 110 so as to guide actuator 110 in rotation, for example about the rotation axis Y110.

Connection member 120 and actuator 110 may be linked by means of at least: i) a linkage pin and ii) a curvilinear bearing portion arranged to guide the at least one linkage pin. Such linkage pin and curvilinear bearing portion form an inexpensive yet accurate rotatable link between the connection member and the actuator. The curvilinear bearing portion may have the form of a circular arc which extends, for example, over an angle ranging from 45 degrees to 120 degrees.

In the example of FIGS. 1 to 14, connection member 120 is linked to actuator 110 by means of two linkage pins 122.1 and 122.2 respectively cooperating with two curvilinear bearing portions 124.1 and 124.2. Curvilinear bearing portions 124.1 and 124.2 are arranged to guide respectively linkage pins 122.1 and 122.2. Each linkage pin 122.1 or 122.2 protrudes on a respective lateral face of connection member 120. Each curvilinear bearing portion 124 extends on a respective side face of actuator 110. Each curvilinear bearing portion 124.1 or 124.2 may have the form of a circular arc which extends over an angle of approximately 60 degrees. Alternatively (not shown), the or each linkage pin may protrude on a side face of the actuator and the curvilinear bearing portion may extend on a lateral face of the connection member.

In the example of FIGS. 1 to 14, the actuator 110 is configured to be manually movable. The actuator 110 and connection member 120 have substantially elongated shapes. The actuator 110 may herein form a lever and connection member 120 may herein be a rod. In the illustrated embodiment, actuator 110 comprises a control portion 110.1 which has a U-shaped cross-section so as to accommodate a substantial portion of connection member 120. Thus, a user can move the actuator 110 manually in order to operate the extension mechanism 104 between the retracted state (FIG. 12) and the extended state (FIG. 13). As the actuator 110 is rotatable with respect to elongate mounting member 102, actuator 110 provides a lever arm to operate conversion mechanism 112.

The actuator 110 and connection member 120 are substantially parallel when the extension mechanism 104 is placed in the extended state, as shown in FIGS. 13 and 14. Due to their elongated shapes and to their substantially parallel arrangement, actuator 110 and connection member 120 keep extension mechanism 104 very compact when viewed in a plane perpendicular to the longitudinal direction X102.

In the example of FIGS. 1 to 14, elongate mounting member 102 comprises a housing part 126 which fully accommodates the extension mechanism 104 in its extended state (FIGS. 3 and 13). Housing part 126 thus protects the actuator 110 and the connection member 120 and mounting element 101 is compact when extension mechanism 104 is in its extended state, as no component protrudes from elongate mounting member 102.

As best shown in FIGS. 5 and 7, the actuator 110 and the connection member 120 have respective outer side walls and respective inner stiffening webs with hollow regions therebetween. Such a design makes it possible to maximize the ratio of the mechanical strength over the weight respectively for the actuator 110 and for the connection member 120.

As shown in FIG. 10, housing part 126 has an opening 127 which is configured for the passage of part of the actuator 110 and part of the connection member 120. When the extension mechanism is in the extended state (FIGS. 3 and 13) a user can access the actuator 110 through opening 127. When extension mechanism 104 is in the retracted state (FIGS. 1 and 12), actuator 110 may protrude from the elongate mounting member 102 through opening 127. Thus, a user can easily reach for actuator 110 and push it as a lever in order to place extension mechanism 104 in its extended state.

The actuator 110 may be at least partly arranged between the connection member 120 and the biasing part 116. The actuator 110 may be interposed between connection member 120 and biasing part 116.

In the illustrated embodiment, actuator 110 has a pushing portion 110.2 which is arranged to push conversion mechanism 112, herein compression part 114, via biasing part 116. Put another way, pushing portion 110.2 indirectly pushes conversion mechanism 112, herein compression part 114. Pushing portion 110.2 may be moveable in translation along longitudinal direction X102 and in rotation, herein about rotation axis Y110, hence orthogonally to longitudinal direction X102. The translatory movement of rotation axis Y110 is transmitted by pushing portion 110.2.

Relative to the actuator 110, pushing portion 110.2 is distant from control portion 110.1. Pushing portion 110.2 may be located on one end of actuator 110 whereas control portion 110.1 may be located on the opposite end of actuator 110 or else in a median region of the actuator 110.

In the illustrated embodiment, the conversion mechanism 112 comprises a guide 130 which is configured to guide actuator 110 both in translation and in rotation, as hereinafter described.

The guide may have at least one guiding slot which extends at least partly along the longitudinal direction. The actuator may further comprise at least one pin configured to slidingly and rotatably move in the at least one guiding slot. Such pin and guiding slot enable translation and rotation of the actuator.

As shown in FIG. 8 or 9, guide 130 has two guiding slots 130.1 and 130.2 which are arranged on two sides of guide 130. Both guiding slots 130.1 and 130.2 extend parallel to longitudinal direction X102. As a complementary arrangement, as shown in FIGS. 6, 7 and 9, actuator 110 may further comprise two pins 132.1 and 132.2 which are configured to slidingly and rotatably move respectively in guiding slots 130.1 and 130.2. Thus, pins 1321 and 132.2 and guiding slots 130.1 and 130.2 enable the actuator 110 to translate parallel to longitudinal direction X102 and to rotate herein about rotation axis Y110.

The guide 130 herein has two grooves 130.3 and 130.4 which are respectively configured for the introduction of pins 132.1 and 132.2 up into the guiding slots 130.1 and 130.2 when an operator assembles the extension mechanism 104.

Besides, guide 130 also guides and holds compression part 114 along longitudinal direction X102. Guide 130 is configured to substantially accommodate compression part 114.

In the illustrated embodiment, mounting element 101 further comprises a friction member 134 which is arranged on an outer end portion 104.1 of the extension mechanism 104 so as to bear against the architectural recess 300, in this case against opposing mounting surface 302, when extension mechanism 104 is in the extended state (FIGS. 3 and 13).

Friction member 134 may be mechanically linked to conversion mechanism 112, herein to compression part 114, such that friction member 134 converts a part of the translatory displacement of rotation axis Y110 along the longitudinal direction X102 into an upwardly-oriented friction force F134, as shown in FIG. 13, when friction member 134 abuts opposing mounting surface 302. Thus, friction member 134 makes it possible to fasten mounting element 101 in architectural recess 300, hence to mount architectural covering 200 between opposing mounting surfaces 302 and 304, because of the upwardly-oriented friction force F134. Upwardly-oriented friction force F134 results from the friction coefficient. The friction member 134 may belong to compression part 114.

In the illustrated embodiment, friction member 134 is arranged to protrude, on a small scale, from the outer end portion 104.1 of the extension mechanism 104 when extension mechanism 104 is placed in the extended state. Depending on the play between architectural recess 300 and mounting element 101, friction member 134 may protrude only on a small scale from outer end portion 104.1. In the illustrated embodiment, friction member 134 is integral with compression part 114. The friction member and the compression part may be made as a single piece.

Alternatively, the friction member may be a component separate from the compression part. The friction member may be secured to the compression part directly or indirectly, i.e. without or with at least one element interposed between the friction member and the compression part.

In the illustrated embodiment, friction member 134 is composed of at least one friction material selected within the group consisting of elastomeric materials and plastics. Alternatively, the friction member may be composed of another material provided the friction member has a surface roughness selected to convert the translatory movement into the upwardly-oriented friction force. The friction member may be elastic or resilient due to its material and/or due to its shape.

At the end (left end) of elongate mounting member 102 opposite the extension mechanism 104, the mounting element 101 may further comprise a supplementary friction member. The supplementary friction member may be substantially similar to friction member 134. The supplementary friction member may be arranged so as to bear against architectural recess 300, in this case against opposing mounting surface 304.

The supplementary friction member may also be configured to convert a part of the translatory movement of rotation axis Y110 into an upwardly-oriented friction force when the supplementary friction member bears against opposing mounting surfaces 302 and 304. This left-hand part of translatory movement of rotation axis Y110 imparts a portion of the compression force F to the supplementary friction member via the stiff portions of elongate mounting member 102. Mounting element 101 may further comprise a supplementary holder which is configured to hold the supplementary friction member. The supplementary friction member is arranged to protrude from the supplementary holder. The mounting element may further comprise a supplementary extension mechanism which is similar or identical to extension mechanism 104 and which is arranged at the other end of the elongate mounting member opposite the end at which is arranged extension mechanism 104, as shown in FIGS. 17 to 27.

Alternatively or complementarily to the presence of a friction member, a friction pad may already be secured to the architectural recess, for example by means of double-sided tape or glue.

As shown in FIG. 14, in order to prevent the extension mechanism 104 from unwittingly returning into the retracted state, extension mechanism 104 is arranged in the extended state (FIG. 14) such that actuator 110 is locked against its rotation from the extended state to the retracted state.

In the example of FIG. 14, actuator 110, biasing part 116, and connection member 120 may be arranged so that the biasing part 116 exerts a locking torque T116 on actuator 110 about connection axis Y120. Locking torque T116 is oriented counter a rotation direction R110 of actuator 110 from the extended state to the retracted state. Thus, locking torque T116 prevents an unexpected self-retraction of the extension mechanism 104. In other words, locking torque T116 can prevent the extension mechanism 104 from unwittingly returning into the retracted state once it has been placed by the user in the extended state.

In order to generate locking torque T116, actuator 110, biasing part 116 and connection member 120 may be arranged such that:
  the mechanical link 110.120 between actuator 110 and connection member 120 is located on the other side, with respect to the mechanical link 110.120 between actuator 110 and connection member 120 when extension mechanism 104 is in the extended state (FIG. 14), of a segment connecting: a) the center of rotation C121 of connection member 120 relative to elongate mounting member 102, to b) the point 110.116 of actuator 110 where is exerted the resultant of the reaction force F116 generated by biasing part 116.

When the mounting element 101 is in service, the extension mechanism 104 is first in its retracted state. A user can, with one hand, hold the mounting element 101 at its mounting position between opposing mounting surfaces 302 and 304. With its other hand, the user can grasp actuator 110, push it as a lever to impart the force F110 to actuator 110 and rotate it herein about rotation axis Y110.

The connection member 120 is driven in rotation about connection direction Y120 by actuator 110 via linkage pins 122.1 and 122.2 guided by the curvilinear bearing portions 124.1 and 124.2.

Pushing portion 110.2 of actuator 110 may rotate about rotation axis Y110 and may slide along longitudinal direction X102 towards opposing mounting surface 302. While sliding, actuator 110 compresses biasing pan 116. Biasing part 116 in turn drives compression part 114 in translation along longitudinal direction X102 towards opposing mounting surface 302.

Once friction member 134 has covered a gap C, between extension mechanism 104 and opposing mounting surface 302, friction member 34 bears against the architectural recess 300. Then, compression part 114 starts to transmit a compression force F to opposing mounting surface 302. Hence, friction member 134 starts to convert a part of the translatory movement into the upwardly-oriented friction force F134.

When extension mechanism 104 reaches its extended state, biasing pan 116 fully generates compression force F. The length difference of biasing part 116 as compared to the retracted state is depicted in FIGS. 12 and 13 with reference sign LD116. Friction member 134 fully produces the upwardly-oriented friction force F134, which enables the mounting element 101 to hold in place the architectural covering 200. The supplementary friction member likewise produces an upwardly-oriented friction force. Thus, the mounting element 101 is force-fitted between opposing mounting surfaces 302 and 304.

Since actuator 110 is locked, as afore-detailed, against its rotation direction R110 from the extended state to the retracted state, the extension mechanism 104 steadily remains in the extended state. The architectural covering 200 thereby remains in its service position.

As a summary, the user only needs to grasp actuator 110, push it as a lever and rotate it in order to impart force F110 to actuator 110 so as to place extension mechanism 104 in the extended state. With one hand a user can hold mounting element 101 at its mounting position and, with its other hand, the user can grasp actuator 110, push it as a lever and rotate it in order to operate, hence impart the force F110 to, the actuator 110 so as to fasten mounting element 101 to architectural recess 300.

Thus, actuator 110 enables a user to easily fasten mounting element 101 between opposing mounting surfaces 302 and 304, herein in architectural recess 300. Such architectural covering 200 can hence be quickly and reliably installed by hand, hence without tool. Once fastened, mounting element 101 achieves a force fit (frictional fit) between opposing mounting surfaces 302 and 304. Mounting element 101 may alternatively or complementarily achieve a form fit, for example if one or both of opposing mounting surfaces 302 and 304 has matching female or male reliefs (not shown).

Vice versa, in case the user wants to detach or unfasten the architectural covering 200 from the architectural recess 300, the user can access the actuator 110 through opening 127. Then the user draws the actuator 110 as a lever so as to rotate it along rotation direction R110. The connection member 120 rotates as well and guides the actuator from the extended state to the retracted state. Thus, such an architectural covering can be quickly and reliably installed by hand, hence without tool between opposing mounting surfaces.

While the actuator 110 rotates, biasing part 116 relaxes and eventually stops generating the compression force F and conversion mechanism 112 stops providing the translatory movement to rotation axis Y110. Friction member 134 and the supplementary friction member stop producing upwardly-oriented friction forces.

By the time the extension mechanism 104 reaches its retracted state, the mounting element 1 no longer holds the architectural covering 200, which the user can then hold by one hand and remove from the architectural recess 300.

Thus, the actuator enables a user to easily fasten or unfasten the mounting element between opposing mounting surfaces. Indeed, the user only needs to impart the force to the actuator so as to place the extension mechanism in the extended state. With one hand a user can hold the mounting element at its mounting position and, with its other hand, the user can push the lever-like actuator to impart the force driving the conversion mechanism, so as to fasten the mounting element to the architectural recess.

FIG. 15 illustrates a second embodiment of a mounting element 101. Inasmuch as the mounting element 101 of FIG. 15 is similar to the mounting element 101 of FIGS. 1 to 14, the afore-detailed description may be applied to the mounting element 101 of FIG. 15, but for the hereinafter mentioned noticeable differences. An element of mounting element 101 of FIG. 15 having a structure or function that is substantially similar to an element of the mounting element 101 of FIGS. 1 to 14 is given the same reference sign or number. Even though two or more figures illustrating different embodiments may have such elements that are structurally and/or functionally similar, the presence of a same reference sign or number in otherwise different embodiments should not be understood as limiting the disclosure to the specific element nor the scope of protection of the claimed subject-matter.

Like the mounting element 101 of FIGS. 1 to 14, the mounting element 101 of FIG. 15 comprises an extension mechanism 104, an actuator 110, a conversion mechanism 112, a compression part 114, a biasing part 116, a connection member 120, a guide 130, and a friction member 134 and a supplementary friction member.

The mounting element 1 of FIG. 15 mainly differs from the mounting element 101 of FIGS. 1 to 14 in that the compression part 114 and the biasing part 116 are reversedly arranged with respect to FIGS. 1 to 14. The mounting element 101 of FIG. 15 also differs from the mounting element 101 of FIGS. 1 to 14 in that the actuator 110 and the connection member 120 are reversedly arranged with respect to FIGS. 1 to 14.

In service, actuator 110 directly pushes compression part 114 in translation towards opposing mounting surface 302, whereas compression part 114 pushes biasing part 116 in translation. Biasing part 116 imparts a compression force to friction member 134 and to the supplementary friction member, which in turn produce upwardly-oriented forces to hold mounting element 101.

FIG. 16 illustrates a third embodiment of a mounting element 101. Inasmuch as the mounting element 101 of FIG. 16 is similar to the mounting element 101 of FIGS. 1 to 14, the afore-detailed description may be applied to the mounting element 101 of FIG. 16, but for the hereinafter mentioned noticeable differences. An element of mounting element 101 of FIG. 16 having a structure or function identical to an element of the mounting element 101 of FIGS. 1 to 14 is given the same reference sign.

Like the mounting element 101 of FIGS. 1 to 14, the mounting element 101 of FIG. 16 may comprise an extension mechanism 104, an actuator 110, a conversion mechanism 112, a compression part 114, a biasing part 116, a connection member 120, a guide 130, and a friction member 134 and a supplementary friction member.

The mounting element 1 of FIG. 16 mainly differs from the mounting element 101 of FIGS. 1 to 14 in that the biasing part 116 is arranged between actuator 110 and connection member 120.

FIGS. 17 to 27 illustrate an independent object having a supplementary extension mechanism 154 which belongs to mounting element 101 and which is arranged a: the opposite end of the elongate mounting member 102 with respect to the above described extension mechanism 104. Thus, the supplementary extension mechanism 154 is located near the flange 105.2. The elongate mounting member 102 thus extends from extension mechanism 104 to supplementary extension mechanism 154.

In the illustrated embodiment, the supplementary extension mechanism 154 has several functional features similar to the extension mechanism 104. A component of supplementary extension mechanism 154 having a similar function as n component of extension mechanism 104 is hereinafter designated with the same reference sign augmented by 50. Supplementary extension mechanism 154 is operable between; i) a retracted state, as depicted on FIGS. 17, 19 and 25, and ii) an extended state, as depicted on FIGS. 18, 20 and 27. FIG. 26 depicts the supplementary extension mechanism 154 placed in an intermediary state between the retracted state and an extended state.

Depending on the distance between the opposing mounting surfaces 304 and 302, the mounting element 101 may be i) in a fastening configuration when supplementary extension mechanism 154 is in an extended state and ii) in a release configuration when supplementary extension mechanism 154 is in the retracted state.

The supplementary extension mechanism 154 may comprise a supplementary actuator 160, a supplementary conversion mechanism 162 and a supplementary compression part 164. Supplementary extension mechanism 154 may further comprise a supplementary sliding portion 163 which is arranged to translate along longitudinal direction X102 with respect to elongate mounting member 102. In the illustrated embodiment, sliding portion 163 is arranged to translate within the elongate mounting member 102. The components of supplementary extension mechanism 154 may be composed of metallic and/or of plastic materials.

The supplementary actuator 160 may be rotatable about a supplementary rotation axis Y160, which is substantially perpendicular to the longitudinal direction X102. The supplementary rotation axis Y160 may form an angle ranging from 80 to 100 degrees, e.g. 90 degrees, with the longitudinal direction X102. The supplementary rotation axis Y160 may be vertical when the mounting element is in a service position.

The supplementary conversion mechanism 162 may be configured to convert a rotation of supplementary actuator 160 into a translatory movement of supplementary rotation axis Y160 along the longitudinal direction X102 from the retracted state to an extended state and vice versa. In the example of FIGS. 17 to 32, the translatory movement of supplementary extension mechanism 154 develops along the longitudinal direction X102.

The supplementary extension mechanism 154 may be arranged so that supplementary compression part 164 may abut opposing mounting surface 304 and thus transmit a compression force to opposing mounting surface 304. In case the distance between the opposing mounting surfaces 304 and 302 is relatively short, the supplementary compression part 164 may abut opposing mounting surface 304 when the supplementary extension mechanism 154 is in its retracted state. In such a case, placing the extension mechanism 104 in its extended state suffices to make both the compression part 104 and the supplementary compression part 164 abut respectively on the opposing mounting surfaces 302 and 304.

As visible when comparing FIGS. 17 and 18 or FIGS. 25 and 27, the supplementary compression part 164 of supplementary extension mechanism 154 translates towards opposing mounting surface 304 (to the left). In other words, supplementary extension mechanism 154 extends in translation (X102) towards opposing mounting surface 304 when supplementary extension mechanism 154 is moved from its retracted state (FIGS. 17 and 25) to an extended state (FIGS. 18 and 27).

Supplementary compression part 164 may be configured to transmit a supplementary compression force along the longitudinal direction X102 towards opposing mounting surface 304. Supplementary compression part 164 substantially may have a prismatic shape extending along longitudinal direction X102. Supplementary compression part 164 may comprise an abutment part 165, as shown in FIG. 22.

When the architectural covering 200 is in its service position, the supplementary compression force may be oriented substantially horizontally and towards opposing mounting surface 304. The supplementary compression force helps hold the mounting element 101 in the architectural recess 300 between opposing mounting surfaces 302 and 304, because it helps generate a friction force, akin to the afore-described force generated by compression part 104.

Supplementary conversion mechanism 162 may comprise a driven portion 163.1 which is fast in translation with supplementary sliding portion 163. Furthermore, supplementary conversion mechanism 162 may comprise four driving surfaces 160.1, 160.2, 160.3 and 160.4 which are configured to cooperate selectively with driven portion 163.1. The driving surfaces 160.1, 160.2, 160.3 and 160.4 are fast in rotation with supplementary actuator 160. Within the supplementary conversion mechanism 162, driven portion 163.1 is configured to cooperate with a selected one of the driving surfaces 160.1, 160.2, 160.3 and 160.4.

As illustrated on FIGS. 25 to 27, the driven portion 163.1 has a semi-cylindrical male cross-section, the shape of which is substantially complementary to each driving surface 160.1, 160.2, 160.3 or 160.4. Thus, driving surface 160.1, 160.2, 160.3 or 160.4 may selectively drive driven portion 163.1 in translation along longitudinal direction X102. The driving surfaces 160.1, 160.2, 160.3 and 160.4 may be arranged such that each driving surface 160.1, 160.2, 160.3 or 160.4 extends substantially perpendicularly to its adjacent driving surfaces. For example, driving surface 160.1 may be arranged such that it extends substantially perpendicularly to its adjacent driving surfaces 160.2 and 160.4.

The supplementary actuator 160 may have an actuating portion 161. In the example of FIG. 24, the actuating portion 161 has a slot 161.1 configured to receive a tool, for example a screwdriver. When a tool is inserted in slot 161.1, a user may exert a torque on the tool to impart rotation to the supplementary actuator 160 about the supplementary rotation axis Y160, selectively clockwise or counterclockwise. As shown on FIGS. 19 and 20, elongate mounting member 102 may have an opening 102.160, e.g. a hole, configured to make the slot 161.1 accessible to a tool from outside, say from under, the elongate mounting member 102.

The supplementary actuator 160 may be configured such that the slot 161.1 has a geometric, center C161.1 substantially located on the rotation axis Y160. As illustrated by double arrows on FIG. 24, the driving surfaces 160.1, 160.2, 160.3 and 160.4 are located at different respective distances from geometric center C161.1. When ranked by increasing distance, driving surface 160.1 is located closest to geometric center C161.1; driving surface 160.2 is located closer to geometric center C161.1 than driving surface 160.3; finally, driving surface 160.4 is the furthest from geometric center C161.1. Each of the afore mentioned distances is measured as a Euclidean distance, i.e. as the shortest distance between geometric center C161.1 and the closest point of the relevant driving surface.

As a result, when driven portion 163.1 bears against driving surface 160.1, as shown in FIG. 25, the outer end of the supplementary compression part 164 is further from the opposing mounting surface 304 than when driven portion 163.1 bears against driving surface 160.2, as shown in FIG. 26, and even further than when driven portion 163.1 bears against driving surface 160.3, as shown in FIG. 27.

Besides, supplementary actuator 160 may comprise a ratchet wheel 167 having several notches 167.1 on its periphery. Complementarily, supplementary conversion mechanism 162 may comprise at least one pawl, herein two pawls 168, configured to fall within the notches 167.1. Pawls 168 may be arranged symmetrically with respect to longitudinal direction X102 when the mounting element 101 is in the assembled state. Ratchet wheel 167 and pawls 168 may be configured to cooperate such that each pawl 168 may fall into a respective notch 167.1 of the ratchet wheel 167. When located into respective notches 167.1, pawls 168 prevent rotation of supplementary actuator 160. In the examples of FIGS. 21 to 24, ratchet wheel 167 and pawls 168 are configured so as to define four discrete, stable positions of the supplementary actuator 160 about supplementary rotation axis Y160. These four discrete, stable positions correspond to the four driving surfaces 160.1, 160.2, 160.3 and 160.4.

In service, a user may insert a tool, e.g. a screwdriver, in slot 161.1 in order to impart a rotation to supplementary actuator 160 about supplementary rotation axis Y160. Such rotation of supplementary actuator 160 is converted by supplementary conversion mechanism 162 into a translatory movement of supplementary sliding portion 163, via the cooperation of driven portion 163.1 with the selected driving surfaces 160.1, 160.2, 160.3 and 160.4. Where supplementary compression part 164 does not abut opposing mounting surface 304, the pawls 168 may release ratchet wheel 167, such that supplementary actuator 160 may rotate about the supplementary rotation axis Y160 from 90, 180 or 270 degrees, depending on the angle selected by the user to set the appropriate overall length of the mounting element 101, i.e. depending on the driving surface 160.1, 160.2, 160.3 or 160.4 selected by the user to press against driven portion 163.1.

The afore-mentioned four discrete, stable positions of the supplementary actuator 160 each correspond to a given protruding distance by which the supplementary compression part 164 protrudes towards opposing mounting surface 304. For example, an increment in the protruding distance may be 1.5 mm between two successive stable positions, i.e. between two successive driving surfaces 160.1, 160.2, 160.3 and 160.4. After the user has set the appropriate overall length, the mounting element 101 can fit in the architectural recess 300 with both the extension mechanism 104 and the supplementary extension mechanism 154 abutting respectively on the opposing surfaces 302 and 304.

FIGS. 28 to 32 illustrate another independent object comprising a battery assembly 401 intended to supply power to a not shown electric motor, in order to wind and unwind the covering member 202. The electric motor may be housed within a roller supporting covering member 202.

The battery assembly 401 may comprise a rechargeable battery pack 402, an output connector 404 and a charger plug 406. The rechargeable battery pack 402 may be comprised of several batteries which may be arranged in a series, parallel or a mixture thereof, depending on the required power characteristics.

The rechargeable battery pack 402 may be configured to be completely accommodated in the elongate mounting member 102 which may herein form a headrail as aforementioned. Elongate mounting member 102 may have a housing space configured to accommodate at least partially rechargeable battery pack 402.

Rechargeable battery pack 402 may be secured to elongate mounting member 102 so as to prevent the user from removing rechargeable battery pack 402 out of elongate mounting member 102. For example, battery assembly 401 may comprise securing elements configured to secure rechargeable battery pack 402 to the elongate mounting member 102 in a non-detachable manner.

The output connector 404 may be a standard DC connector configured to get connected to the electric motor. When supplied with power from the rechargeable battery pack 402, the electric motor may wind or unwind the covering member 202 upon receipt of a dedicated command signal. In the example of FIGS. 28 to 32, output connector 404 is located outside the elongate mounting member 102 so as to be easily connected to the electric motor. A cable may connect the output connector 404 to the rechargeable battery pack 402.

The charger plug 406 may be a standard plug configured to connect rechargeable battery pack 402 to a recharging power source. Charger plug 406 and elongate mounting member 102 may be configured so that charger plug 406 is accessible from outside the elongate mounting member 102. For example, elongate mounting member 102 may comprise a hole 102.406 for accessing charger plug 406 and thus plug rechargeable battery pack 402 to a not shown charger or recharging power source.

In service, when the rechargeable battery pack 402 needs to be recharged, the user may: i) either plug in a charger while the mounting element 101 remains mounted in architectural recess 300, ii) or remove from architectural recess 300 the whole mounting element 101 and displace it to get rechargeable battery pack 402 recharged at a dedicated charging installation.

FIG. 32 illustrate yet another independent object. Elongate mounting member 102 may herein comprise mounting clips 103.1, 103.2, 103.3 arranged to help mount, for example, a horizontal blind or a roman blind onto the mounting element 101 so as to install the architectural covering 200.

FIGS. 33 to 36 illustrate a fourth embodiment of a mounting element lot. Inasmuch as the mounting element 101 of FIGS. 33 to 36 is similar to the mounting element 101 of FIGS. 1 to 14, the afore-detailed description may be applied to the mounting element 101 of FIGS. 33 to 36, but for the hereinafter mentioned noticeable differences. An element of mounting element 101 of FIGS. 33 to 36 having a structure or function that is substantially similar to an element of the mounting element 101 of FIGS. 1 to 14 is given the same reference sign or number. Even though two or more figures illustrating different embodiments may have such elements that are structurally and/or functionally similar, the presence of a same reference sign or number in otherwise different embodiments should not be understood as limiting the disclosure to the specific element nor the scope of protection of the claimed subject-matter.

Like the mounting element 101 of FIGS. 1 to 14, the mounting element 101 of FIGS. 33 to 36 comprises an extension mechanism 104, an actuator 110, a conversion mechanism 112, a compression part 114, a biasing part 116, a connection member 120, a hinge 121, and a guide 130. Further, the mounting element 101 of FIGS. 33 to 36 comprises a flange 105.1.

The mounting element 1 of FIGS. 33 to 36 differs from the mounting element 101 of FIGS. 1 to 14 in that compression part 114 may be configured so as to transmit, towards an opposing mounting surface 302, a compression force F that is applied below the longitudinal centerline of the elongate mounting member 102, when the extension mechanism 104 reaches its extended state (FIGS. 34 and 36). The longitudinal centerline of the elongate mounting member 102 may herein be represented by the longitudinal direction X102. In the plane of FIG. 34 an offset distance D separates the application direction of the compression force F from the centerline of the elongate mounting member 102. The longitudinal centerline of the elongate mourning member 102 may be defined as the longitudinal neutral axis, with respect to the moments of inertia, of the elongate mounting member 102, or as the line that extends parallel to the longitudinal direction X102 and that passes through the center of gravity of the elongate mounting member 102.

Hence, the mounting element 101 comprises the elongate mounting member 102, which is elongated along a longitudinal direction X102, and an extension mechanism 104, which is arranged at an end of the elongate mounting member 102. The extension mechanism 104 is operable between: i) a retracted state (FIGS. 33 and 35) and ii) an extended state (FIGS. 34 and 36). The extension mechanism 104 comprises the compression part 114 that protrudes in the longitudinal direction X102. The compression part may be configured so as to transmit, towards an opposing mounting surface 302, a compression force F that is applied below the longitudinal centerline of the elongate mounting member 102, when the extension mechanism 104 reaches its extended state (FIGS. 34 and 36).

Further, the extension mechanism 104 includes a conversion mechanism 112 which is equipped with the compression part 114, the compression part 114 being configured to transmit a compression force F along the longitudinal direction X102 towards the opposing mounting surface 302.

Likewise, at the opposite end of the elongate mounting member 102, a not shown supplementary compression part may be configured to transmit, in an extended state, a supplementary compression force that is applied below the longitudinal centerline of the elongate mounting member 102. Such a supplementary compression part may be substantially similar to the supplementary compression part 164 of FIG. 27.

The reactions of the opposing mounting surface 302 to compression force F that is applied below the centerline of elongate mounting member 102 and, as the case may be, to a corresponding supplementary compression force may thus induce a moment M as symbolized by on FIG. 34. The moment M may be represented as producing its effect i) on the center of gravity of the elongate mounting member 102 and ii) around an axis perpendicular to the plane of FIG. 34.

When the mounting element 101 of FIGS. 33 to 36 is in service in the extended state of the extension mechanism 104, actuator 110 directly pushes compression part 114 towards opposing mounting surface 302, whereas compression part 114 pushes biasing part 116 in translation. Biasing part 116 imparts a compression force to friction member 134 and to the supplementary friction member, which in turn produce upwardly-oriented forces to hold mounting element 101, as described for example in relation to FIG. 13.

As a result, the moment M causes a slight bending upwards of the elongate mounting member 102, which tends to deflect the central region. Thus, the moment M enhances the resistance to the gravity forces that apply on the mounting element 101, such that the elongate mounting member 102 may be kept rectilinear along the longitudinal direction X102. In other words, the moment M contributes to avoiding that the elongate mounting member 102 bends downwards over time after the installation of the mounting element 101 in an architectural recess.

Besides, compression part 114 may have two protrusions 115.1 and 115.2, which may be configured to transmit two respective components of the compression force F to the opposing mounting surface 302. The protrusions 115.1 and 115.2 may be located on the lateral sides of compression part 114 in a direction perpendicular to the longitudinal direction X102. In the example of FIG. 33, each protrusion 115.1 or 115.2 extends obliquely downwards with respect to the outer planar face of compression part 114, as also visible at FIG. 38, thus defining an oblique angle A115 which is herein approximately. The protrusions 115.1 and 115.2 may enhance the lateral stabilization of the mounting element 101 in service. Compression part 114 may be made of a metallic material, for example of a steel or aluminum.

In a not shown variant, the compression part may have only one protrusion, which may be configured to be located under the centerline of the elongate mounting member. Such a protrusion may for example also extend obliquely downwards with respect to the outer face of the compression part.

The mounting element 1 of FIGS. 33 to 36 further differs from the mounting element 101 of FIGS. 1 to 14 in that it may comprise a damping elastic member 117 which is configured to dampen the kinetic energy of the guided part of actuator 110 when the extension mechanism 104 is returned to the retracted state. Thus, damping elastic member 117 may prevent the actuator 110 from bumping against the abutment part of guide 130, and thereby may have an effect on the service life of guide 130.

In the example of FIGS. 33 to 36 the damping elastic member 117 includes two damping springs which are arranged on both sides of the actuator 110. Each damping spring of damping elastic member 117 may be formed by a compression helical spring that works parallel to the longitudinal direction X102. Each damping spring of damping elastic member 117 may extend between the abutment part of guide 130 and a respective pin 132.1, 132.2 that is movable in a respective guiding slot 130.1, 130.2, as described in relation to FIGS. 1 to 14.

In a not shown alternative variant, the damping elastic member may include only one damping spring, which may be arranged at the centerline of the elongate mounting member and which may be formed by a compression helical spring that works parallel to the longitudinal direction. Such a damping spring may also extend between an abutment part of the guide and a pin that is movable in a guiding slot.

The damping elastic member 117 is less compressed when the extension mechanism 104 is in its extended state (FIGS. 34 and 36) than when the extension mechanism 104 is in its retracted state (FIGS. 33 and 35). In the embodiment of FIGS. 33 to 36 the damping elastic member 117 may be i) completely unloaded when the extension mechanism 104 is in its extended state, and ii) elastically deformed, hence compressed, when the extension mechanism 104 is in its retracted state.

To facilitate the mounting of the extension mechanism 104 and the accurate, reliable positioning of the damping springs of damping elastic member 117, the guide 130 may comprise positioning pins 118 that respectively extend at least partially into the damping springs so as to center the same.

Besides, as represented on FIG. 36, the assembly of guide 130 onto the end of elongate mounting member 102 may offer an angular play AP, which may compensate a possible misalignment of the not shown architectural recess.

FIGS. 37 and 38 illustrate a fifth embodiment of a mounting element 101. Inasmuch as the mounting element 101 of FIGS. 37 and 38 is similar to the mounting element 101 of FIGS. 33 to 36, the afore-detailed description may be applied to the mounting element 101 of FIGS. 37 and 38, but for the hereinafter mentioned noticeable differences. An element of mounting element 101 of FIGS. 37 and 38 having a structure or function that is substantially similar to an element of the mounting element 101 of FIGS. 33 to 36 is given the same reference sign or number. Even though two or more figures illustrating different embodiments may have such elements that are structurally and/or functionally similar, the presence of a same reference sign or number in otherwise different embodiments should not be understood as limiting the disclosure to the specific element nor the scope of protection of the claimed subject-matter.

The mounting element of FIGS. 37 and 38 differs from the mounting element 101 of FIGS. 33 to 36 in that flange 105.1 may be integral with compression part 114. In service the flange 105.1 may support for example a roller blind below the elongate mounting member 102. In the example of FIGS. 37 and 38, flange 105.1 may be one-piece with compression part 114, whereas flange 105.1 is secured to the elongate mounting member 102 in the embodiments of FIGS. 1 to 14 and 33 to 36.

In a not shown alternative embodiment, the flange may be secured to the compression part 114 by any suitable means, for example rivets or welds. In a further not shown alternative embodiment the flange made integral with the compression part may have the shape of an open square box, so as to hold a venetian blind. Alternatively, the flange may be configured to support a pleated blind, a honeycomb blind, roman shades etc.

The flange 105.1 of FIGS. 37 and 38 fulfils a substantially similar function as flange 105.1 of FIGS. 1 to 14 and 33 to 36, as it is configured to hold a covering member together with a supplementary flange located at the opposite end of the mounting element. Such an integral flange 105.1 of FIGS. 37 and 38 defines a compact assembly for the extension mechanism 104.

The mounting element of FIGS. 37 and 38 further differs from the mounting element 101 of FIGS. 33 to 30 in that it comprises a friction member 134, which fulfils a substantially similar function as the friction member 134 of FIGS. 1 to 14. Friction member 134 may be made of an elastomeric material. A set of friction members of different sizes may be delivered along with the mounting element to facilitate the user in finding a suitable friction member.

Friction member 134 of FIGS. 37 and 38 is thinner, along longitudinal direction X102, than friction member 134 of FIGS. 1 to 14. Thus, the longitudinal deformation of friction member 134 of FIGS. 37 and 38 is smaller than the longitudinal deformation of friction member 134 of FIGS. 1 to 14.

Besides, friction member 134 of FIGS. 37 and 38 has an upper region 134.1 that is thinner than the bottom region. Such a thinner upper region 134.1 ensures that the contact region with the opposing mounting surface 302 will remain below the centerline of elongate mounting member 102.

Like compression part 114 of FIGS. 33 to 36, compression part 114 of FIGS. 37 and 38 may comprise two protrusions 115.1 and 115.2. In the example of FIG. 38 protrusions 115.1 and 115.2 extend obliquely downwards with respect to main planar body of compression part 114. Such downwards oblique extension contributes to suitably orienting and generating the moment M.

Like extension mechanism 104 of FIGS. 33 to 36, extension mechanism 104 of FIGS. 37 and 38 may include a damping elastic member 117. The damping elastic member 117 may also be comprised of two damping compression helical springs that work parallel to the longitudinal direction X102.

In a not shown alternative variant, the compression part may have only one protrusion, which may be configured to be located under the centerline of the elongate mounting member. Such a protrusion may for example also extend obliquely downwards with respect to the outer face of the compression part.

In order to fasten friction member 134 to compression part 114, friction member 134 has recesses 135.1 and 135.2, which are configured to receive and position, by complementary shapes, the protrusions 115.1 and 115.2. Further, friction member 134 has a fitting protrusion 136, which is configured to fit into a corresponding hole in compression part 114. A rivet 137 may fasten the compression part 114 to the guide 130. Alternatively, friction member 134 and compression part 114 may also be glued or adhered to one another.

FIGS. 39 to 43 illustrate a sixth embodiment of a mounting element 101. Inasmuch as the mounting element 101 of FIGS. 39 to 43 is similar to the mounting dement 101 of FIGS. 1 to 5, the afore-detailed description may be applied to the mounting element 101 of FIGS. 39 to 43, but for the hereinafter mentioned noticeable differences. An element of mounting element 101 of FIGS. 39 to 43 having a structure or function that is substantially similar to an element of the mounting dement 101 of FIGS. 1 to 5 is given the same reference sign or number. Even though two or more figures illustrating different embodiments may have such elements that are structurally and/or functionally similar, the presence of a same reference sign or number in otherwise different embodiments should not be understood as limiting the disclosure to the specific element nor the scope of protection of the claimed subject-matter.

The hereafter-described embodiments are considered in the configuration where the mounting element 101 is fastened to the opposing mounting surfaces, e.g. when the architectural covering 200 is mounted between the two opposing mounting surfaces 302, 304 of recess 300. The mounting element 101 of FIGS. 39 to 43 differs from the mounting element 101 of FIGS. 1 to 5 in that it includes a lateral flange 105, which is configured to come out of a front side 306 of recess 300. Optionally, lateral flange 105 may be configured to extend along an upper front surface 308 of the wall the recess 300 is located in.

Lateral flange 105 may be configured to connect elongate mounting member 102 to covering member 202 of architectural covering 200. Lateral flange 105 may be configured to support covering member 202 above the level of elongate mounting member 102 when the mounting element 101 is fastened to the opposing mounting surfaces. Covering member 202 and elongate mounting member 102 extend along respective axes which are offset in a direction perpendicular to the longitudinal direction X102. Covering member 202 can thus be mounted above and in front of the recess 300, in a so-called face fit configuration, instead of in the recess 300 like in the example of FIGS. 1 to 5. Thus, the windows may be opened inwards and under the rolled-up covering member 202. Also, covering member 202 may extend beyond the opposing mounting surfaces 302, 304 both in the longitudinal direction X102 and on top of the recess 300. Thus, a length L202 of covering member 202 may be larger than a length L300 of recess 300.

Like in the example of FIGS. 1 to 5, architectural covering 200 is mounted between opposing mounting surfaces 302, 304 of recess 300. But, unlike the example of FIGS. 1 to 5, architectural covering 200 is not located or extending between the two opposing mounting surfaces 302, 304, nor is the covering member 200 located underneath the elongate mounting member 102. Elongate mounting member 102 extends along longitudinal direction X102. Like in the example of FIGS. 1 to 5, mounting element 101 may include an extension mechanism 104 having a compression part 114 and a supplementary extension mechanism 154 having a supplementary compression part 164.

In the example of FIGS. 40 and 41, lateral flange 1115 is integral, for example one-piece, with elongate mounting member 102. Lateral flange 105 may be substantially comprised of a plate, which extends vertically when the mounting element 101 is fastened to the opposing mounting surfaces 302, 304. In a not shown alternative embodiment, the lateral flange and the elongate mounting member may be two separate components that are coupled by suitable fastening elements. Such suitable fastening elements may form a permanent coupling, like rivets, or a dismountable coupling, like bolts. Alternatively, the lateral flange and the elongate mounting member may be fastened by snap fit or friction fit, thus without separate, additional fastening elements.

In the example of FIG. 39, covering member 202 is a roller blind. Alternatively, the covering member may be a Venetian blind, a pleated blind, a honeycomb blind, roman shade etc.

In a not shown alternative embodiment, the lateral flange may be configured to support a covering member beside, e.g. level with, the elongate mounting member when the mounting element is fastened to the opposing mounting surfaces. The lateral flange may be configured to protrude away from the recess when the mounting element is fastened to the opposing mounting surfaces. For example, the lateral flange may extend substantially horizontally or obliquely upwards.

Mounting element tot may include two holding flanges 105.3, 105.4, which are configured to couple lateral flange 105 to covering member 202 so as to hold the covering member 202. Each one of holding flanges 105.3, 105.4 substantially includes a holding portion 105.31 or 105.41, which is configured to hold a respective end of covering member 202. The holding portions 105.31, 105.41 may include brackets or clips. Each one of holding flanges 105.3, 105.4 substantially includes a coupling portion 105.32 or 105.42, which is configured to be coupled to lateral flange 105. In the example of FIGS. 40, 41 and 42, the longitudinal ends of lateral flange 105 define two respective slots 105.6, which open outwards and are configured to receive a respective coupling portion 105.32 or 105.42. Each one of the holding flanges 105.3, 105.4 substantially has an L-shape, which is defined by the holding portion 105.31 or 105.41 and the coupling portion 105.32 or 105.42 which respectively extend perpendicularly to each other.

In order to assemble coupling portions 105.32, 105.42 to lateral flange 105, an operator may insert coupling portions 105.32, 105.42 respectively into slots 105.6 along the arrows shown in FIG. 42. Each coupling portion 105.32, 105.42 may have a tapered end portion in order to facilitate the insertion into the respective slot 105.6. Each coupling portion 105.32, 105.42 may have abutment surfaces that are arranged to abut on respective edges of lateral flange 105, so as to stop the respective coupling portion 105.32 or 105.42 at a predetermined position in the longitudinal direction X102.

Further, the edges of the coupling portions 105.32, 105.42 may have indentations arranged to secure each coupling portion 105.32, 105.42 to lateral flange 105. For example, the indentations may allow the lateral flange 105 to be plastically deformed into the indentations so as to permanently fasten coupling portions 105.32, 105.42 to lateral flange 105. In a not shown alternative embodiment, the indentations may cooperate with an elastically deformable part of lateral flange so as to clip coupling portions to lateral flange.

FIGS. 44 to 47 illustrate a seventh embodiment of a mounting element 101. Inasmuch as the mounting element 101 of FIGS. 44 to 47 is similar to the mounting element 101 of FIGS. 39 to 43, the afore-detailed description may be applied to the mounting element 101 of FIGS. 44 to 47, but for the hereinafter mentioned noticeable differences. An element of mounting element 101 of FIGS. 39 to 43 having a structure or function that is substantially similar to an element of the mounting element 101 of FIGS. 39 to 43 is given the same reference sign or number. Even though two or more figures illustrating different embodiments may have such elements that are structurally and/or functionally similar, the presence of a same reference sign or number in otherwise different embodiments should not be understood as limiting the disclosure to the specific element nor the scope of protection of the claimed subject-matter.

The hereafter-described embodiments are considered in the configuration where the mounting element 101 is fastened to the opposing mounting surfaces 302, 304, e.g. when the architectural covering 200 is mounted between the two opposing mounting surfaces 302, 304 of recess 300.

The mounting element 101 of FIGS. 44 to 47 differs from the mounting element lot of FIGS. 39 to 43 in that covering member 202 is a Venetian blind instead of a roller blind. Further, the mounting element 101 of FIGS. 44 to 47 differs from the mounting element 101 of FIGS. 39 to 43 in that it includes two supporting flanges 105.7, 105.8, which are configured to support covering member 202, in lieu of the holding flanges 105.3, 105.4 in FIGS. 39 to 43. Each supporting flange 105.7, 105.8 may be fastened to lateral flange 105 by any suitable fastening element, e.g. screws, rivets or welds. In the example of FIGS. 44 to 47 supporting flanges 105.7.105.8 are a conventional type, herein configured to cooperate by clipping into a frame or headrail of venetian blind 202 and have at least one lever configured to release the clipping connection.

Like in the example of FIGS. 39 to 43 the covering member 202 can thus be mounted above and in front of the recess 300, in a so-called face fit configuration, instead of in the recess 300 like in the example of FIGS. 1 to 5. Thus, the windows may be opened inwards and under the rolled-up covering member 202. Also, covering member 202 may extend beyond the opposing mounting surfaces both in the longitudinal direction X102 and on top of the recess 300.

Thus, a length L202 of covering member 202 may be larger than a length L300 of recess 300.

Although some exemplary embodiments and aspects have been described above in relation to the exemplary drawings, the present disclosure is not limited to the exemplary embodiments and aspects described above and illustrated in the exemplary drawings wherein the reference numbers are only provided as non-limiting examples. Many changes and alternatives may be made by the skilled person within the scope at the present disclosure, which scope shall not be limited to the appended drawings. The features of the respective exemplary embodiments and aspects may be interchangeably implemented and/or combined in any technically feasible way as long as the resulting subject-matter is covered by the appended claims.

In the foregoing description, it will be appreciated that the phrases "at least one", "one or more", and "and/or", as used herein, are open-ended expressions that are both conjunctive and disjunctive in operation. The term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, counter-clockwise, and/or the like) are only used for identification purposes to aid the reader's understanding of the present disclosure, and/or serve to distinguish regions of the associated elements from one another, and do not limit the associated element, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

It is to be understood by one of ordinary skill in the art that the present discussion is a description of exemplary embodiments only, and is not intended as limiting the broader aspects of the present disclosure.

All apparatuses and methods discussed in this document are examples of apparatuses and/or methods implemented in accordance with one or more principles of this disclosure. These examples are not the only way to implement these principles but are merely examples. Thus, references to elements or structures or features in the drawings must be appreciated as references to examples of embodiments of the disclosure, and should not be understood as limiting the disclosure to the specific elements, structures, or features illustrated. Other examples of manners of implementing the disclosed principles will occur to a person of ordinary skill in the art upon reading this disclosure.

It will be appreciated that although some components are illustrated as separate elements, any two or all three components may be consolidated into an integral element instead.

The or each embodiment illustrated in the figures has several separate and independent features, which each, at least alone, has unique benefits which are desirable for, yet nut critical to, the presently disclosed mounting element. Therefore, the various separate features described herein need not all be present in order to achieve at least some of the desired characteristics and/or benefits described herein. One or more separate features may be combined, or only one of the various features need be present in a mounting element formed in accordance with various principles of the present disclosure. Moreover, throughout the present disclosure, reference numbers are used to indicate a generic element or feature of the disclosed embodiment. The same reference number may be used to indicate elements or features that are not identical in form, shape, structure, etc., yet which provide similar functions or benefits. Additional reference characters (such as letters, as opposed to numbers) may be used to differentiate similar elements or features from one another.

The foregoing description has broad application. It should be appreciated that the concepts disclosed herein may apply to many types of shades, in addition to the shades described and depicted herein. Similarly, it should be appreciated that the concepts disclosed herein may apply to many types of mounting elements, in addition to the mounting element 101 described and depicted herein. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

While the foregoing description and drawings represent various embodiments, it will be understood that various additions, modifications, and substitutions may be made therein without departing from the spirit and scope of the present disclosure. In particular, it will be clear to those skilled in the art that principles of the present disclosure may be embodied in other forms, structures, arrangements, proportions, and with other elements, materials, and components, without departing from the spirit or essential characteristics thereof. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present disclosure. For example, elements shown as integrally formed may be constructed of multiple parts or elements shown as multiple parts may be integrally formed, the operation of elements may be reversed or otherwise varied, the sire or dimensions of the elements may be varied. The presently disclosed embodiments are therefore to be considered in all respects as illustrative and not restrictive, the scope of the invention being indicated by the appended claims, and not limited to the foregoing description.

In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

While a mounting element formed in accordance with the principles of the present disclosure is particularly shown and described herein with reference to particular embodiments, it is to be understood that the disclosed embodiments may be used with many additions, substitutions, or modifications of form, structure, arrangement, proportions, materials, and components and otherwise, used in the practice of the disclosure, which are particularly adapted to specific environments and operative requirements without departing from the spirit and scope of the present disclosure. The presently disclosed embodiments are therefore to be considered in all respects as illustrative and not restrictive, the scope of the invention being indicated by the appended claims, and not limited to the foregoing description.

While the foregoing description and drawings represent examples of embodiments of the present subject matter, it will be understood that various additions, modifications, and substitutions may be made therein without departing from the spirit and scope of the present subject matter or the principles thereof. For instance, it will be clear to those skilled in the art that the present subject matter may be embodied in other specific forms, structures, arrangements, proportions, and with other elements, materials, components, and otherwise, such as may be particularly adapted to specific environments and operative requirements, without departing from the spirit or essential characteristics thereof. While the disclosure is presented in terms of embodiments, it should be appreciated that the various separate features of the present subject matter need not all be present in order to achieve at least some of the desired characteristics and/or benefits of the present subject matter or such individual features. It will be appreciated that various features of the disclosure are grouped together in one or more aspects, embodiments, or configurations for the purpose of streamlining the disclosure. However, various features of the certain aspects, embodiments, or configurations of the disclosure may be combined in alternate aspects, embodiments, or configurations, and features described with respect to one embodiment typically may be applied to another embodiment, whether or not explicitly indicated. Accordingly, individual features of any embodiment may be used and can be claimed separately or in combination with features of that embodiment or any other embodiment. Moreover, elements shown as integrally formed may be constructed of multiple parts or elements shown as multiple parts may be integrally formed, the operation of elements may be reversed or otherwise varied, the size or dimensions of the elements may be varied. Therefore, the present disclosure is not limited to only the embodiments specifically described herein. The presently disclosed embodiments are therefore to be considered in all respects as illustrative and not restrictive, the scope of the claimed subject matter being indicated by the appended claims, and not limited to the foregoing description.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of moans, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

The invention claimed is:

1. A mounting element for mounting an architectural covering between two opposing mounting surfaces, the mounting element comprising:
    an elongate mounting member which is elongated in a longitudinal direction and defines a longitudinal centerline extending parallel to the longitudinal direction, and
    an extension mechanism arranged at an end of the elongate mounting member, the extension mechanism being operable between: i) a retracted state, and ii) an extended state,
    wherein the extension mechanism comprises:
        an actuator rotatable about a rotation axis, and
        a conversion mechanism configured to convert rotation of the actuator into a translatory movement of the rotation axis along the longitudinal direction from the retracted state to the extended state and vice versa, the conversion mechanism including a compression part configured to transmit a compression force that is applied to one of the opposing mounting surfaces, and
    wherein:
    in the extended state, the extension mechanism is arranged to abut the one of the opposing mounting surfaces when the mounting element is mounted between the opposing mounting surfaces;
    the compression force is applied by the compression part to the one of the opposing mounting surfaces at a compression location disposed vertically below the longitudinal centerline of the elongate mounting member such that the compression force induces an upwardly directed bending moment on the elongate mounting member; and
    the compression part comprises a protrusion extending outwardly from a body of the compression part, the protrusion being configured to engage the one of the opposing mounting surfaces at the compression location such that the protrusion applies the compression force against the one of the opposing mounting surfaces and induces the upwardly directly bending moment on the elongate mounting member.

2. The mounting element of claim 1, wherein the longitudinal centerline of the elongate mounting member is defined as a neutral longitudinal axis for the elongate mounting member.

3. The mounting element of claim 1, wherein:
    the bending moment is induced at a center of gravity of the elongate mounting member; and
    the longitudinal centerline of the elongate mounting member passes through the center of gravity of the elongate mounting member.

4. The mounting element of claim 1, wherein the protrusion extends outwardly and vertically downwardly from the body of the compression part at an oblique angle relative to a planar face of the body.

5. The mounting element of claim 1, wherein:
    the protrusion comprises a first protrusion;
    the compression part comprises a second protrusion extending outwardly from the body of the compression part and being spaced apart from the first protrusion in a direction perpendicular to the longitudinal direction; and the second protrusion being configured to contact the one of the opposing mounting surfaces at a second compression location disposed vertically below the longitudinal centerline such that the second protrusion applies a compression force against the one of the opposing mounting surfaces and the first and second protrusions collectively induce the upwardly directly bending moment on the elongate mounting member.

6. The mounting element of claim 1, wherein:
the compression part comprises an upper compression portion including the protrusion configured to transmit the compression force to the one of the opposing mounting surfaces and a flange portion formed integrally with the upper compression portion and extending outwardly therefrom; and
the flange portion is configured to support an architectural covering relative to the elongate mounting member.

7. The mounting element of claim 6, wherein:
the extension mechanism further comprises a friction member configured to be positioned between the compression part and the one of the opposing mounting surfaces when the extension member is in the extended state; and
the friction member defines at least one recess configured to receive the protrusion of the upper compression portion.

8. The mounting element of claim 1, wherein the extension mechanism further comprises a friction member configured to be positioned between the compression part and the one of the opposing mounting surfaces when the extension member is in the extended state.

9. The mounting element of claim 8, wherein:
the friction member comprises a first portion and a second portion;
the first portion of the friction member is aligned with the longitudinal centerline of the elongate mounting member;
the second portion of the friction member is at least partially aligned between the protrusion and the compression location and defines a contact region at which the extension mechanism abuts against the one of the opposing mounting surfaces when the mounting element is mounted between the opposing mounting surfaces; and
a thickness of the friction member varies between the first and second portions such that the contact region is offset from the longitudinal centerline of the elongate mounting member.

10. The mounting element of claim 1, wherein:
the conversion mechanism further comprises a biasing part and a damping elastic member operably coupled to the actuator;
the biasing part is configured to generate the compression force against the compression part when the extension mechanism is moved to the extended state; and
the damping elastic member is configured to dampen motion of the actuator as the extension mechanism is moved to the retracted state.

11. The mounting element of claim 10, wherein:
the actuator includes a first end and a second end opposite the first end, with the rotation axis of the actuator being disposed adjacent to the first end of the actuator;
the first end of the actuator is configured to compress the biasing part as the extension mechanism is moved from the retracted state to the extended state; and
the first end of the actuator is configured to compress the damping elastic member as the extension mechanism is moved from the extended state to the retracted state.

12. The mounting element of claim 11, wherein the biasing part comprises at least one biasing spring positioned on one side of the first end of the actuator and the damping elastic member comprises at least one damping spring positioned on an opposed side of the first end of the actuator.

13. A mounting element for mounting an architectural covering between two opposing mounting surfaces, the mounting element comprising:
an elongate mounting member which is elongated in a longitudinal direction, and
an extension mechanism arranged at an end of the elongate mounting member, the extension mechanism being operable between: i) a retracted state, and ii) an extended state,
wherein the extension mechanism comprises:
an actuator rotatable about a rotation axis, and
a conversion mechanism configured to convert rotation of the actuator into a translatory movement of the rotation axis along the longitudinal direction from the retracted state to the extended state and vice versa, the conversion mechanism including a compression part configured to transmit a compression force that is applied to one of the opposing mounting surfaces, the conversion mechanism further including a biasing part operably coupled to a first end portion of the actuator along a first side of the first end portion of the actuator and a damping elastic member operably coupled to the first end portion of the actuator along an opposed second side of the first end portion of the actuator, the biasing part being configured to generate the compression force against the compression part as the extension mechanism is moved to the extended state, the damping elastic member being configured to dampen motion of the actuator as the extension mechanism is moved to the retracted state; and
wherein in the extended state, the extension mechanism is arranged to abut the one of the opposing mounting surfaces when the mounting element is mounted between the opposing mounting surfaces.

14. The mounting element of claim 13, wherein:
the actuator includes the first end portion and a second end portion opposite the first end portion, with the rotation axis of the actuator being disposed adjacent to the first end portion of the actuator;
the first end portion of the actuator is configured to compress the biasing part as the extension mechanism is moved from the retracted state to the extended state; and
the first end portion of the actuator is configured to compress the damping elastic member as the extension mechanism is moved from the extended state to the retracted state.

15. The mounting element of claim 14, wherein the biasing part comprises at least one biasing spring positioned on the first side of the first end portion of the actuator and the damping elastic member comprises at least one damping spring positioned on the second side of the first end portion of the actuator.

16. The mounting element of claim 13, wherein:
the elongate mounting member defines a longitudinal centerline extending parallel to the longitudinal direction; and the compression force is applied by the compression part to the one of the opposing mounting surfaces at a compression location that is offset vertically below the longitudinal centerline of the elongate mounting member such that the compression force induces an upwardly directed bending moment on the elongate mounting member.

17. A mounting element for mounting an architectural covering between two opposing mounting surfaces, the mounting element comprising:

an elongate mounting member which is elongated in a longitudinal direction and defines a longitudinal centerline extending parallel to the longitudinal direction; and an extension mechanism arranged at an end of the elongate mounting member, the extension mechanism being operable between: i) a retracted state, and ii) an extended state;

wherein the extension mechanism comprises:

an actuator rotatable about a rotation axis;

a conversion mechanism configured to convert rotation of the actuator into a translatory movement of the rotation axis along the longitudinal direction from the retracted state to the extended state and vice versa, the conversion mechanism including a compression part configured to transmit a compression force that is applied to one of the opposing mounting surfaces; and a friction member configured to be positioned between the compression part and the one of the opposing mounting surfaces when the extension member is in the extended state;

wherein in the extended state, the extension mechanism is arranged to abut the one of the opposing mounting surfaces when the mounting element is mounted between the opposing mounting surfaces; and the compression force is applied by the compression part to the one of the opposing mounting surfaces at a compression location that is offset and spaced apart from the longitudinal centerline of the elongate mounting member such that the compression force induces a bending moment on the elongate mounting member; and wherein the friction member comprises a first portion and a second portion;

the first portion of the friction member is aligned with the longitudinal centerline of the elongate mounting member;

the second portion of the friction member is at least partially aligned with the compression location and defines a contact region at which the extension mechanism abuts against the one of the opposing mounting surfaces when the mounting element is mounted between the opposing mounting surfaces; and a thickness of the friction member varies between the first and second portions such that the contact region is offset from the longitudinal centerline of the elongate mounting member.

* * * * *